(12) United States Patent  (10) Patent No.: US 8,402,101 B2
Callaghan  (45) Date of Patent: Mar. 19, 2013

(54) RELIABLE MESSAGING INSTRUCTION

(75) Inventor: David M. Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 177 days.

(21) Appl. No.: 12/766,073

(22) Filed: Apr. 23, 2010

(65) Prior Publication Data

US 2010/0205271 A1  Aug. 12, 2010

Related U.S. Application Data

(63) Continuation of application No. 11/067,164, filed on Feb. 25, 2005, now Pat. No. 7,706,895.

(51) Int. Cl.
*G06F 15/16* (2006.01)
(52) U.S. Cl. .................................. 709/206; 719/315
(58) Field of Classification Search .............. 709/206; 719/315
See application file for complete search history.

(56) References Cited

U.S. PATENT DOCUMENTS

| | | |
|---|---|---|
| 4,570,217 A | 2/1986 | Allen et al. |
| 4,771,606 A | 9/1988 | Mose et al. |
| 5,068,778 A | 11/1991 | Kosem et al. |
| 5,093,782 A | 3/1992 | Muraski et al. |
| 5,296,851 A | 3/1994 | Ikuta et al. |
| 5,508,909 A | 4/1996 | Maxwell et al. |
| 5,537,548 A | 7/1996 | Fin et al. |
| 5,602,936 A | 2/1997 | Green et al. |
| 5,742,845 A | 4/1998 | Wagner |
| 5,748,930 A | 5/1998 | Prakash |
| 5,808,907 A | 9/1998 | Shetty et al. |
| 5,832,221 A | 11/1998 | Jones |
| 5,873,086 A | 2/1999 | Fujii et al. |
| 5,875,430 A | 2/1999 | Koether |
| 5,933,347 A | 8/1999 | Cook et al. |
| 5,950,006 A | 9/1999 | Crater et al. |
| 5,960,200 A | 9/1999 | Eager et al. |
| 5,963,448 A | 10/1999 | Flood et al. |
| 5,966,304 A | 10/1999 | Cook et al. |
| 5,984,502 A | 11/1999 | Calder |
| 6,032,154 A | 2/2000 | Coleman et al. |
| 6,061,603 A | 5/2000 | Papadopoulos et al. |
| 6,105,017 A | 8/2000 | Kleewein et al. |

(Continued)

OTHER PUBLICATIONS

Object Management Group, Notification Service Specification Version 1.0.1, Aug. 2002, pp. 2-1 to 3-35.*

(Continued)

*Primary Examiner* — John Follansbee
*Assistant Examiner* — Glenford Madamba
(74) *Attorney, Agent, or Firm* — Turocy & Watson, LLP; R. Scott Speroff; John M. Miller

(57) ABSTRACT

The subject invention provides reliable messaging with and within a control environment. The systems and methods utilize a message broker that facilitates message exchange. The message broker can be located within an industrial controller, as a dedicated entity within a control environment and/or an entity external to the control environment. Messages transmitted from an industrial controller and/or the external entity can be routed through the message broker prior to reaching a destination, wherein the message can be stored in the message broker and subsequently obtained by a recipient. The message broker decouples the message sender (e.g., an industrial controller, an external entity . . . ) from the message recipient (e.g., an industrial controller, an external entity . . . ) such that messages can be successfully transmitted (to the message broker) regardless of a state of the recipient, and messages can be retrieved (from the message broker) regardless of a state of the sender.

20 Claims, 20 Drawing Sheets

U.S. PATENT DOCUMENTS

| | | | |
|---|---|---|---|
| 6,157,649 A | 12/2000 | Pierce et al. | |
| 6,170,044 B1 | 1/2001 | McLaughlin et al. | |
| 6,182,252 B1 | 1/2001 | Wong et al. | |
| 6,185,466 B1 | 2/2001 | Nicewonger | |
| 6,268,853 B1 | 7/2001 | Hoskins et al. | |
| 6,272,400 B1 | 8/2001 | Jankins et al. | |
| 6,282,454 B1 | 8/2001 | Papadopoulos et al. | |
| 6,298,377 B1 | 10/2001 | Hartikainen et al. | |
| 6,304,973 B1 | 10/2001 | Williams | |
| 6,311,149 B1 | 10/2001 | Ryan et al. | |
| 6,327,511 B1 | 12/2001 | Naismith et al. | |
| 6,345,259 B1 | 2/2002 | Sandoval | |
| 6,370,448 B1 | 4/2002 | Eryurek | |
| 6,370,569 B1 | 4/2002 | Austin | |
| 6,389,470 B1 | 5/2002 | Barr | |
| 6,408,277 B1 | 6/2002 | Nelken | |
| 6,418,430 B1 | 7/2002 | DeFazio et al. | |
| 6,430,604 B1 | 8/2002 | Ogle et al. | |
| 6,434,157 B1 | 8/2002 | Dube et al. | |
| 6,453,210 B1 | 9/2002 | Belotserkovskiy et al. | |
| 6,463,352 B1 | 10/2002 | Tadokoro et al. | |
| 6,484,177 B1 | 11/2002 | Van Huben et al. | |
| 6,505,247 B1 | 1/2003 | Steger et al. | |
| 6,556,950 B1 | 4/2003 | Schwenke et al. | |
| 6,560,235 B1 | 5/2003 | Jones | |
| 6,564,212 B2 | 5/2003 | Koskas | |
| 6,587,900 B1 | 7/2003 | Wischinski | |
| 6,606,654 B1 | 8/2003 | Borman et al. | |
| 6,608,638 B1 | 8/2003 | Kodosky et al. | |
| 6,618,856 B2 | 9/2003 | Coburn et al. | |
| 6,633,883 B2 | 10/2003 | Koskas | |
| 6,662,118 B2 | 12/2003 | Carle et al. | |
| 6,684,238 B1 | 1/2004 | Dutta | |
| 6,701,314 B1 | 3/2004 | Conover et al. | |
| 6,728,262 B1 | 4/2004 | Woram | |
| 6,732,191 B1 | 5/2004 | Baker et al. | |
| 6,751,562 B1 | 6/2004 | Blackett et al. | |
| 6,760,782 B1 | 7/2004 | Swales | |
| 6,763,040 B1 | 7/2004 | Hite et al. | |
| 6,779,051 B1 | 8/2004 | Basil et al. | |
| 6,801,920 B1 | 10/2004 | Wischinski | |
| 6,802,053 B1 | 10/2004 | Dye et al. | |
| 6,810,429 B1 | 10/2004 | Walsh et al. | |
| 6,816,913 B1 | 11/2004 | Liebenow | |
| 6,819,960 B1 | 11/2004 | McKelvey et al. | |
| 6,822,945 B2 | 11/2004 | Petrovykh | |
| 6,832,118 B1 | 12/2004 | Heberlein et al. | |
| 6,842,779 B1 | 1/2005 | Mishizawa et al. | |
| 6,850,252 B1 | 2/2005 | Hoffberg | |
| 6,859,718 B2 | 2/2005 | Fritz et al. | |
| 6,862,553 B2 | 3/2005 | Schwenke et al. | |
| 6,865,596 B1 | 3/2005 | Barber et al. | |
| 6,891,849 B1 | 5/2005 | Jasperneite et al. | |
| 6,928,514 B2 | 8/2005 | Chatterjee et al. | |
| 6,931,429 B2 | 8/2005 | Gouge et al. | |
| 6,944,555 B2 | 9/2005 | Blackett et al. | |
| 6,950,848 B1 | 9/2005 | Yousefi'zadeh | |
| 6,957,112 B2 | 10/2005 | Ina et al. | |
| 6,975,913 B2 | 12/2005 | Kreidler et al. | |
| 6,993,456 B2 | 1/2006 | Brooks et al. | |
| 7,010,294 B1 | 3/2006 | Pyotsia et al. | |
| 7,043,532 B1 | 5/2006 | Humpleman et al. | |
| 7,055,056 B2 | 5/2006 | Bessire | |
| 7,058,460 B2 | 6/2006 | Dolansky | |
| 7,058,712 B1 | 6/2006 | Vasko et al. | |
| 7,080,066 B1 | 7/2006 | Scheurich et al. | |
| 7,085,670 B2 | 8/2006 | Odom et al. | |
| 7,130,701 B1 | 10/2006 | Wischinski | |
| 7,151,966 B1 | 12/2006 | Baier et al. | |
| 7,159,007 B2 | 1/2007 | Stawikowski | |
| 7,162,510 B2 | 1/2007 | Jammes | |
| 7,162,534 B2 | 1/2007 | Schleiss et al. | |
| 7,168,075 B1 | 1/2007 | Barthel et al. | |
| 7,181,487 B1 | 2/2007 | Marbach et al. | |
| 7,185,045 B2 | 2/2007 | Ellis et al. | |
| 7,194,446 B1 | 3/2007 | Bromley et al. | |
| 7,203,560 B1 | 4/2007 | Wylie et al. | |
| 7,206,643 B2 | 4/2007 | Ruutu et al. | |
| 7,216,043 B2 | 5/2007 | Ransom | |
| 7,216,109 B1 | 5/2007 | Donner | |
| 7,216,120 B2 | 5/2007 | Yoshida et al. | |
| 7,216,181 B1* | 5/2007 | Jannu et al. | 709/246 |
| 7,225,037 B2 | 5/2007 | Shani | |
| 7,233,830 B1 | 6/2007 | Callaghan et al. | |
| 7,248,978 B2 | 7/2007 | Ransom | |
| 7,251,535 B2 | 7/2007 | Farchmin et al. | |
| 7,266,476 B2 | 9/2007 | Coburn et al. | |
| 7,277,457 B2 | 10/2007 | Gorday et al. | |
| 7,293,038 B2 | 11/2007 | Blevins et al. | |
| 7,330,473 B1 | 2/2008 | Baier et al. | |
| 7,331,049 B1* | 2/2008 | Jin | 719/314 |
| 7,372,826 B2 | 5/2008 | Dahod et al. | |
| 7,395,122 B2 | 7/2008 | Kriedler et al. | |
| 7,457,815 B2 | 11/2008 | Hsu et al. | |
| 7,512,906 B1 | 3/2009 | Baier et al. | |
| 7,536,548 B1 | 5/2009 | Batke et al. | |
| 7,729,284 B2 | 6/2010 | Ukrainetz et al. | |
| 7,802,264 B2* | 9/2010 | Robertson et al. | 709/215 |
| 2002/0022982 A1 | 2/2002 | Cooperstone et al. | |
| 2002/0082736 A1 | 6/2002 | Lech et al. | |
| 2002/0087229 A1 | 7/2002 | Pasadyn et al. | |
| 2002/0116453 A1 | 8/2002 | Todorov et al. | |
| 2002/0120728 A1 | 8/2002 | Braatz et al. | |
| 2002/0124011 A1 | 9/2002 | Baxter et al. | |
| 2002/0133807 A1 | 9/2002 | Sluiman | |
| 2002/0156837 A1 | 10/2002 | Batke et al. | |
| 2002/0156838 A1 | 10/2002 | Batke et al. | |
| 2002/0174161 A1 | 11/2002 | Scheetz et al. | |
| 2002/0174178 A1 | 11/2002 | Stawikowski | |
| 2002/0194365 A1 | 12/2002 | Jammes | |
| 2003/0014387 A1 | 1/2003 | Kreidler et al. | |
| 2003/0014500 A1 | 1/2003 | Schleiss et al. | |
| 2003/0023336 A1 | 1/2003 | Kreidler et al. | |
| 2003/0033376 A1 | 2/2003 | Brownhill et al. | |
| 2003/0035439 A1 | 2/2003 | Watanabe | |
| 2003/0051074 A1 | 3/2003 | Edwards | |
| 2003/0061384 A1 | 3/2003 | Nakatani | |
| 2003/0120593 A1* | 6/2003 | Bansal et al. | 705/39 |
| 2003/0120803 A1 | 6/2003 | Loughran et al. | |
| 2003/0120817 A1 | 6/2003 | Ott et al. | |
| 2003/0140094 A1 | 7/2003 | Collier et al. | |
| 2003/0149718 A1 | 8/2003 | Theimer | |
| 2003/0154147 A1 | 8/2003 | Parry | |
| 2003/0208595 A1 | 11/2003 | Gouge et al. | |
| 2003/0214955 A1 | 11/2003 | Kim | |
| 2003/0225796 A1 | 12/2003 | Matsubara | |
| 2003/0233429 A1 | 12/2003 | Matte et al. | |
| 2004/0010627 A1 | 1/2004 | Ellis et al. | |
| 2004/0010778 A1 | 1/2004 | Kaler et al. | |
| 2004/0025060 A1 | 2/2004 | Raffaele et al. | |
| 2004/0039468 A1 | 2/2004 | Zahorack et al. | |
| 2004/0057662 A1 | 3/2004 | Morfino | |
| 2004/0081197 A1 | 4/2004 | Liu | |
| 2004/0107345 A1 | 6/2004 | Brandt et al. | |
| 2004/0111512 A1 | 6/2004 | Barth | |
| 2004/0117624 A1 | 6/2004 | Brandt et al. | |
| 2004/0143628 A1 | 7/2004 | Bradford et al. | |
| 2004/0153171 A1 | 8/2004 | Brandt et al. | |
| 2004/0153508 A1 | 8/2004 | Alcorn et al. | |
| 2004/0153819 A1 | 8/2004 | Bjorsne et al. | |
| 2004/0165544 A1 | 8/2004 | Cornett et al. | |
| 2004/0181543 A1 | 9/2004 | Wu et al. | |
| 2004/0193439 A1 | 9/2004 | Marrott | |
| 2004/0201602 A1 | 10/2004 | Mody et al. | |
| 2004/0225402 A1 | 11/2004 | Chang et al. | |
| 2004/0230567 A1* | 11/2004 | Wookey | 707/3 |
| 2004/0259531 A1 | 12/2004 | Wood et al. | |
| 2005/0010311 A1 | 1/2005 | Barbazette et al. | |
| 2005/0015619 A1* | 1/2005 | Lee | 713/201 |
| 2005/0021676 A1 | 1/2005 | Chambers et al. | |
| 2005/0038853 A1 | 2/2005 | Blanc et al. | |
| 2005/0039040 A1 | 2/2005 | Ransom et al. | |
| 2005/0042999 A1 | 2/2005 | Rappaport | |
| 2005/0074036 A1 | 4/2005 | Gorday et al. | |
| 2005/0103767 A1 | 5/2005 | Kainec et al. | |
| 2005/0131551 A1 | 6/2005 | Ruutu et al. | |
| 2005/0138432 A1 | 6/2005 | Ransom et al. | |

| | | | |
|---|---|---|---|
| 2005/0144186 | A1 | 6/2005 | Hesselink et al. |
| 2005/0144616 | A1 | 6/2005 | Hammond et al. |
| 2005/0177709 | A1 | 8/2005 | Kim |
| 2005/0188351 | A1 | 8/2005 | Hoefler et al. |
| 2005/0198034 | A1* | 9/2005 | Boyer .......................... 707/10 |
| 2005/0198138 | A1 | 9/2005 | Heller et al. |
| 2005/0216897 | A1 | 9/2005 | Amrhein et al. |
| 2005/0273205 | A1 | 12/2005 | Nickerson et al. |
| 2006/0002356 | A1 | 1/2006 | Barany et al. |
| 2006/0010318 | A1 | 1/2006 | Coley et al. |
| 2006/0015773 | A1 | 1/2006 | Singh et al. |
| 2006/0026672 | A1 | 2/2006 | Braun |
| 2006/0031447 | A1 | 2/2006 | Holt et al. |
| 2006/0041661 | A1 | 2/2006 | Erikson et al. |
| 2006/0059253 | A1 | 3/2006 | Goodman et al. |
| 2006/0080409 | A1 | 4/2006 | Bieber |
| 2006/0108411 | A1 | 5/2006 | Macurek et al. |
| 2006/0117295 | A1* | 6/2006 | Wu et al. ..................... 717/104 |
| 2006/0129690 | A1 | 6/2006 | Hill et al. |
| 2006/0136558 | A1* | 6/2006 | Sheehan et al. ............... 709/203 |
| 2006/0155865 | A1 | 7/2006 | Brandt et al. |
| 2006/0159032 | A1 | 7/2006 | Ukrainetz et al. |
| 2006/0178760 | A1 | 8/2006 | Mann et al. |
| 2006/0259634 | A1 | 11/2006 | Hood et al. |
| 2006/0287746 | A1 | 12/2006 | Braithwaite et al. |
| 2007/0135947 | A1 | 6/2007 | Bromley et al. |
| 2007/0234339 | A1 | 10/2007 | Kostadinov |

OTHER PUBLICATIONS

OA dated May 5, 2011 for U.S. Appl. No. 11/020,371, 38 pages.
OA dated Aug. 25, 2011 for U.S. Appl. No. 11/065,953, 12 pages.
OA dated Aug. 30, 2011 for U.S. Appl. No. 11/020,371, 25 pages.
OA dated Feb. 8, 2011 for U.S. Appl. No. 11/065,953, 23 pages.
Amnon Barak, et al., Performance of PVM with the MOSIX Preemptive Process Migration Scheme, Proc. 7th Israeli Conf. on Computer Systems and Software Engineering, Jun. 1996, 8 pages.
Bickley, et al. The Integration of two control systems. Proceedings of the Particle Acelerator Conference, 1995 vol. 4, May 1-5 pp. 2220-2222 vol. 4 Digital Object Identifier 10.1109/PAC. 1995.505504. http://epaper.kek.jp/p95/ARTICLES/MPA/MPA12.PDF. Last accessed Feb. 6, 2009, 3 pages.
Bonastre, et al. A new generic architecture for the implementation of intelligent and distributed control systems. IEEE 2002 28th Annual Conference of the Industrial Electronics Society (IECON 02), vol. 3, Nov. 5-8, 2002 pp. 1790-1795 http://ieeexplore.ieee.org/stamp/stamp.jsp?arnumber=1185242&isnumber=26591. Last accessed Feb. 7, 2009, 6 pages.
Capella, et al. A bridge crane advanced control system implemented by means of a distributed expert system. In: Proceedigns Emerging Technologies and Factory Automation, 2003 (ETFA '03). IEEE Conference vol. 2, Sep. 16-19, 2003 pp. 347-353 vol. 2 Digital Object Identifier 10.1109/ETFA 2003-1248720.
Capella, et al. Distributed and mobile systems based on wireless networks: definition of a generic control architecture. International Conference on Industrial Technology, IEEE ICIT '04, vol. 2, Dec. 8-10, 2004, pp. 830-835 vol. 2 Digital Object Identifier 10.1109/ICIT.2004.1490182.
Caro. Real-Time Networks in Industrial Automation. Dedicated System Magazines—2000-13 Q2. http://www.dedicated-systems.com, last accessed Apr. 6, 2009, 4 pages.
Decotignie, et al. Fulfilling Temporal Constraints in Fieldbus. International Conference on Industrial Electronics, Control and Instrumentation, 1993. Proceedings of the IECON'93, Nov. 15-19, 1993, pp. 519-524, vol. 1. DOI: 10.1109/IECON.1993.339022. http://ieeexplore.ieee.org/stamp/stamp.jsp?arnumber=339022&isnumber=7958. Last accessed Feb. 7, 2009, 6 pages.
European Search Report for European Application No. EP 05 02 7967, dated Apr. 6, 2009, 8 pages.
European Search Report,for European Patent Application No. EP03026338, mailed Mar. 29, 2004, 3 pages.
Freeman. Achieving real-time Ethernet. Manufacturing Engineer, vol. 83, Issue 3, Jun.-Jul. 2004 pp. 14-15.
Furmanski, et al. Controller area network implementation in microwave systems. 14th International Conference on Microwaves, Radar and Wireless Communications, MIKON-2002, vol. 3, May 20-22, 2002 pp. 869-873 Digital Object Identifier 10.1109/MIKON. 2002. 1017975. http://ieeexplore.ieee.org/stamp/stamp.jsp?arnumber=1017975&isnumber=21906. Last accessed Feb. 7, 2009, 5 pages.
Garcia, et al. Reconfigurable Distributed Network Control System for Industrial Plant Automation. IEEE Transactions on Industrial Electronics, vol. 51, Issue 6, Dec. 2004 pp. 1168-1180. http://ieeexplore.ieee.org/stamp/stamp.jsp?arnumber=1360057&isnumber=29830. Last accessed Feb. 7, 2009, 13 pages.
Groza, et al. Cryptographic Authentication on the Communication from an 8051 Based Development Board over UDP. The Third International Conference on Internet Monitoring and Protection, ICIMP '08. Jun. 29-Jul. 5, 2008, pp. 92-97 Digital Object Identifier 10.1109/ICIMP. 2008.27. http://ieeexplore.ieee.org/stamp/stamp.jsp?arnumber=4561332&isnumber=4561311. Last accessed Feb. 7, 2009, 6 pages.
Gustavson, et al. The Scalable Coherent Interface (SCI). Communications Magzine, IEEE vol. 34, Issue 8, Aug. 1996 pp. 52-63 Digital Object Identifier 10.1109/35.533919. http://ieeexplore.ieee.org/stamp/stamp.jsp?arnumber=533919&isnumber=11187. Last accessed Feb. 7, 2009, 12 pages.
Hong, et al. Analysis of real-time data transmission in the DLL of IEC/ISA fieldbus. IEEE International Symposium on Industrial Electronics, 1998. Proceedings ISIE'98, vol. 2, Jul. 7-10, 1998, pp. 694-699. Digital Object Identifier 10.1109/ISIE. 1998.711706. http://ieeexplore.ieee.org/stamp/stamp.jsp?arnumber=711706&isnumber=15303. Last accessed Feb. 7, 2009, 6 pages.
Mossin, et al. Networked Control Systems Distance Learning: State of Art, Tendencies and a New Fieldbus Remote Laboratory Proposal. IEEE International Symposium on Industrial Electronics, ISIE 2007. Jun. 4-7, 2007 pp. 1870-1875, Digital Object Identifier 10.1109/ISIE. 2007.4374892. http://ieeexplore.ieee.org/stamp/stamp.jsp?arnumber=4374892&isnumber=4374555. Last accessed Feb. 7, 2009, 6 pages.
OA dated Feb. 3, 2010 for U.S. Appl. No. 11/020,371, 31 pages.
OA dated Jun. 12, 2009 for U.S. Appl. No. 11/764,702, 35 pages.
OA dated Aug. 18, 2009 for U.S. Appl. No. 11/020,371, 58 pages.
OA dated Aug. 20, 2009 for U.S. Appl. No. 11/026,210, 32 pages.
OA dated Sep. 23, 2009 for U.S. Appl. No. 11/067,164, 18 pages.
OA dated Sep. 25, 2009 for U.S. Appl. No. 11/065,953, 18 pages.
OA dated Nov. 10, 2009 for U.S. Appl. No. 11/079,152, 25 pages.
OA Dated Mar. 19, 2009 for U.S. Appl. No. 11/067,164, 37 pages.
OA dated Apr. 1, 2009 for U.S. Appl. No. 11/079,152, 68 pages.
OA Dated Apr. 17, 2009 for U.S. Appl. No. 11/020,371, 38 pages.
OA Dated Apr. 30, 2009 for U.S. Appl. No. 11/065,953, 22 pages.
OA Dated Aug. 27, 2008 for U.S. Appl. No. 11/067,164, 27 pages.
OA Dated Dec. 15, 2008 for U.S. Appl. No. 11/020,371, 56 pages.
OA Dated Dec. 29, 2008 for U.S. Appl. No. 11/764,702, 54 pages.
OA Dated Jan. 5, 2009 for U.S. Appl. No. 11/143,207, 40 pages.
OA Dated Jan. 9, 2009 for U.S. Appl. No. 11/026,210, 16 pages.
OA Dated Jul. 1, 2008, for U.S. Appl. No. 11/143,207, 42 pages.
OA Dated Jun. 25, 2008 for U.S. Appl. No. 11/065,953, 21 pages.
OA Dated Nov. 18, 2008 for U.S. Appl. No. 11/065,953, 24 pages.
OA Dated Sep. 5, 2008 for U.S. Appl. No. 11/026,210, 40 pages.
Pardi Junior, et al. A Supervisory Tool for Real-Time Industrial Automation Systems. In: Proceedings of the Sixth IEEE International Symposium on Object-Oriented Real-Time Distributed Computing (ISORC'03), IEEE 0-7695-1928-8/03. Downloaded from IEEE Xplore on Mar. 24, 2009, 8 pages.
Rodriguez-Martinez, et al. "MOCHA: A Self-Extensible Database Middleware System for Distributed Data Sources." SIGMOD Record, ACM, USA, vol. 29, No. 2, Jun. 2000, pp. 213-224. XP002520426. http://citeseerx.ist.psu.edu/viewdoc/summary?doi=10.1.1.43.492. Last accessed Jun. 11, 2009, 12 pages.
Sanz, et al. PCT: Component-based Process Control Testbed Decision and Control. European Control Conference, CDC-ECC '05, Dec. 12-15, 2005 pp. 1577-1582. http://ieeexplore.ieee.org/stamp/stamp.jsp?arnumber=1582383&isnumber=33412. Last accessed Feb. 7, 2009, 6 pages.
Song, et al. PEFP monitoring system through an Analog Input to Ethernet Convereter. Particle Accelerator Conference, IEEE, Jun.

25-29, 2007 pp. 287-289 Digital Object Identifier 10.1109/PAC. 2007.4440.187. http://accelconf.web.cern.ch/AccelConf/p07/PAPERS/MOPAN059.PDF.

V. Ramesh, et al., A Methodology for Interschema Relationship Identification in Heterogeneous Databases, Proceedings of the 28th Annual Hawaii International Conference on System Sciences, 1995, 10 pages.

Von Siegfried Staiger. Objektorientierte Planung und Abwicklung von Fertigungsauftragen, Geislingen/Steige, Oct. 1995.

Wikipedia Definition for "Controller" http://en.wikipedia.org/wiki/Controller_%28_theory%29.

Wikipedia Definition for "Protocol Stack" http://en.wikipedia.org/wiki/Protocol_Stack.

Wikipedia definitions for RDF and URI.

Wikipedia, "RS-232" (http://en.wikipedia.org/wiki/RS-232).

Wikipedia, http://en.wikipedia.org/wiki/EoIP.

Wojszniz, et al. Neural network assisted control loop tuner. Proceedings of the IEEE International Conference on Control Applications, vol. 1, Aug. 22-27, 1999 pp. 427-431 vol. 1 Digital Object Identifier 10.1109/CCA.1999.806673.

Wollshlaeger, et al. Web Integration of Factory Communication Systems Using an XML Framework. In: Proceedings of the IEEE International Symposium on Industrial Electronics, ISIE 2002. Jul. 8-11, 2002, NJ, USA, vol. 1, pp. 146-151. XP010598161.

Zwoll, et al. A Low Cost Local Area Network for Connecting Accelerator Equipment. IEEE Transactions on Nuclear Science, vol. 32, Issue 5, Part I, Oct. 1985 pp. 2077-2079. Digital Object Identifier 10.1109/TNS.1985.4333820. http://ieeexplore.ieee.org/stamp/stamp.jsp?arnumber=4333820&isnumber=4333649. Last accessed Feb. 7, 2009, 3 pages.

OA dated Mar. 1, 2010 for U.S. Appl. No. 11/079,152, 22 pages.
OA dated Feb. 13, 2008 for U.S. Appl. No. 11/065,953, 18 pages.
OA dated Sep. 18, 2007 for U.S. Appl. No. 11/065,953, 16 pages.
OA dated Apr. 4, 2007 for U.S. Appl. No. 11/065,953, 29 pages.
OA dated Sep. 10, 2007 for U.S. Appl. No. 11/026,210, 37 pages.
OA dated Mar. 17, 2008 for U.S. Appl. No. 11/026,210, 21 pages.
OA dated Apr. 4, 2007 for U.S. Appl. No. 11/026,210, 21 pages.
OA dated Feb. 22, 2008 for U.S. Appl. No. 11/143,207, 31 pages.
OA dated Mar. 17, 2008 for U.S. Appl. No. 11/067,164, 46 pages.
OA dated Nov. 27, 2006 for U.S. Appl. No. 11/141,527, 10 pages.
OA dated Aug. 10, 2007 for U.S. Appl. No. 10/298,852, 15 pages.
OA dated Jan. 24, 2008 for U.S. Appl. No. 10/298,852, 21 pages.
OA dated Jan. 6, 2005 for U.S. Appl. No. 10/298,852, 16 pages.
OA dated Jul. 1, 2005 for U.S. Appl. No. 10/298,852, 14 pages.
Official Communication dated Apr. 4, 2006 for European Application No. 03026338.8, 8 pages.
OA dated Jul. 21, 2010 for U.S. Appl. No. 11/065,953, 24 pages.
OA dated Sep. 2, 2010 for U.S. Appl. No. 11/079,152, 22 pages.
European Search Report Dated Oct. 4, 2010 for European Patent Application No. EP 06 00 3990, 7 pages.
Statement in accordance with the notice from the European Patent Office dated Oct. 1, 2007 concerning Business Methods—EPC / Erklaerung Gemaess Der Mitteilung Des Europaeischen Patentamts Vom Oct. 1, 2007 Ueber Geschaeftsmethoden—EPU / Declaration Conformement Au Communique De L'Office Europ. Nov. 1, 2007 XP002456252. Last accessed Oct. 13, 2010, 1 page.

* cited by examiner

RELIABLE MESSAGING INSTRUCTION

RELATED APPLICATIONS

This application is a continuation of U.S. patent application Ser. No. 11/067,164 filed on Feb. 25, 2005 and entitled "RELIABLE MESSAGING INSTRUCTION," the entirety of which is incorporated herein by reference.

TECHNICAL FIELD

The subject invention relates to industrial control systems and, more particularly, to systems and methods that facilitate reliable messaging with and/or within an industrial environment.

BACKGROUND OF THE INVENTION

Electronic commerce, or e-commerce, generally refers to business conducted over an electronic medium such as the Internet (e.g., through the World Wide Web, or Web). Electronic commerce transactions typically are facilitated through applications such as web services, electronic shopping carts, file transfer protocol (FTP), secure FTP, electronic data interchange (EDI), email, and Universal Description, Discovery, and Integration (UDDI), among others. Electronic commerce transactions commonly are differentiated based on the type of trading partners that are interacting. For example, commerce between a business and a consumer generally is referred to as business-to-consumer (B2C) commerce, whereas commerce between businesses generally is referred to as business-to-business (B2B) commerce. Integration servers can be utilized to couple business and/or consumer trading partners and coordinate communication therebetween. By way of example, two businesses that employ disparate operating systems and/or applications can utilize an integration server to interact across internal and external networked computer systems.

In many instances, e-commerce can leverage information obtained from control systems and/or affect control systems. For example, a consumer purchasing an automobile through a dealer's web site may desire to know the lead time associated with building an automobile with a customized set of options. The dealer may query its manufacturing plants to ascertain whether an automobile with those options has been built or is going to be built. The result along with additional information can facilitate determining when such automobile will arrive at the distributor. If the purchaser decides to place a custom order (e.g., where there is no plan to build a car with the desired combination of options), the custom specification can be provided to the manufacturing plant and utilized to automatically configure one or more control systems therein. For example, the customer may have specified the color green as the external color of the automobile. This data can be conveyed to a control system and utilized to automatically select a suitable paint gun (e.g., a paint gun associated with green paint) and/or green paint when the automobile is being assembled.

Control systems commonly employ one or more industrial controllers. A typical industrial controller is a special purpose processing device for controlling (e.g., via an automated and a semi-automated means) industrial processes, machines, manufacturing equipment, plants, and the like. Such controllers can execute a control program or routine in order to measure one or more process variables or inputs representative of a status of a controlled process and/or effectuate outputs associated with control of the process. For example, an output module can interface directly with a controlled process by providing an output from memory to an actuator such as a motor, drive, valve, solenoid, and the like. In distributed control systems, controller hardware configuration can be facilitated by separating the industrial controller into a number of control elements, each of which can perform a different function. Particular control modules needed for the control task can be connected together on a common backplane within a rack and/or through a network or other communications medium. Various control modules can also be spatially distributed along a common communication link in several locations. Data can be communicated with these remote modules over a common communication link, or network, wherein any or all modules on the network communicate via a common and/or an industrial communications protocol.

Controllers within a control system can communicate with each other, with controllers residing in other control systems and/or with systems and/or applications outside of a control environment (e.g., business related systems and applications). Conventionally, such communication is achieved through a retry approach, wherein a controller can transmit a message (e.g., a request, information . . . ) to another entity, and if the message is not accepted by the entity (e.g., the entity/recipient is busy, inoperable, unavailable, unresponsive . . . ), the message transmission is aborted and the message is re-sent at a later time, or discarded. In another conventional approach, a message queue and an indexing scheme is utilized, wherein messages are stored in an array and an array index determines which message is transmitted. With this approach, even if a message transmission fails, the index is incremented and an attempt is made to send a next message. Eventually, failed transmissions are either re-sent or discarded.

Thus, conventional techniques usually require synchronous-based messaging, wherein the sender and the recipient are available to engage in a message exchange session. This can lead to, among other things, failed communications (e.g., messages that are not received or acted upon), delayed responses (e.g., as a function of the time difference between a sent message and a re-send), and additional overhead (e.g., consumption of processing cycles to review stored notifications, schedule re-transmissions and re-send messages). Moreover, industrial automation PLC programs that include messaging rely on users creating and maintaining library of ladder logic to implement message retry logic, communication protocols in ladder code, and other inconveniences.

SUMMARY OF THE INVENTION

The following presents a simplified summary of the subject invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The systems and methods of the subject invention relate to reliable messaging mechanisms. Such mechanisms can mitigate the aforementioned deficiencies with conventional techniques utilized for communication between control systems and between control systems and one or more entities external to a control environment. Thus, the novel systems and method of the subject invention can reduce overhead and substantially ensure that messages can be successfully transmitted and/or received. Such mechanisms can include employing a component (e.g., a broker, a messaging broker, a mail box . . . ) that can receive and store messages, manage stored messages, dynamically morph to adjust to received and/or removed messages, self-debug (e.g., diagnostics and recovery), and allow messages to be read, copied, and/or removed.

In addition, the subject invention can provide a single PLC instruction which replaces unwieldy code and complexity, while providing a new class of PLC messaging services currently unavailable. This component can decouple the message sender from the message recipient such that messages can be successfully transmitted regardless of a state of the recipient, and messages can be retrieved regardless of a state of the sender. The foregoing can substantially guarantee that a transmitted message is received, at least by the component, and that a receiving entity can retrieve, obtain, receive, etc. the message, a copy of the message, a representation of the message, etc. from the component. In addition, there may be multiple receiving entities that can process the published messages providing for scalability and fault tolerance. Moreover, this component can reside within a control environment (e.g., within one or more industrial controllers and/or as one or more dedicated components) and/or be external to a control environment.

In one aspect of the subject invention, a system is provided that includes a message broker that facilitates reliable message exchange with and within a control environment. Any message transmitted by the control environment can be stored within and/or retrieved from the message broker, where suitable read and/or write privileges are granted. Likewise, any message transmitted to the control environment can be stored within and/or retrieved from the message broker, where suitable read and/or write privileges are granted. Thus, transmission of a message can be independent of a state (e.g., unknown, error, off, diagnostic, unavailable . . . ) of a recipient, and/or receipt of the message can be independent of a state (e.g., unknown, off, diagnostic, unavailable . . . ) of a sender. Thus, messages can be reliably exchanged (e.g., synchronously or asynchronously) regardless of whether both the sender and recipient of a data exchange session are concurrently available to interact. These messaging mechanisms also support a one to one (1:1) client/server ratio for a queue design, as well as the 1 to many (1:n) and/or many to 1 (n:1) pub/sub topic based design, wherein n is an integer greater than 1.

Suitable external entities that can exchange data with the control environment include one or more state machines, robots, subscribers to the broker, databases, servers, clients, integration servers, applications, business systems, Enterprise Resource Planning (ERP) systems, Manufacturing Execution Systems (MESs), Machine Control (MC) systems, etc. The control environment can include one or more control systems, wherein respective control systems can include one or more industrial controllers (e.g., hard and soft) that can control various plants, machines, apparatuses, processes, systems, equipment, etc. Furthermore, the one or more controllers can include one or more receiving, transmitting and/or transcieving components that facilitate exchanging messages. Moreover, the broker can reside in one or more of a controller of the control environment, a dedicated component of the control environment, and a component external to the control environment.

In one aspect of the invention, the broker is associated with a security mechanism that authenticates and/or authorizes access to the broker. Such security can be employed to determine whether an entity can convey data and/or a message to the broker and/or whether an entity can obtain (e.g., copy, read, extract . . . ) and/or manipulate (e.g., modify, remove, delete . . . ) data and/or messages stored in the broker. In addition, the system provides for acknowledging when a message is successfully received and/or stored by the broker. Essentially, any known mechanism can be utilized such as, for example, eventing, acknowledging (ACK/NAK), broadcasting, unicasting, multicasting, etc. Moreover, the broker can be dynamic in nature in that its storage size and characteristics can change (e.g., increase and/or decrease, morph, adjust, adapt . . . ) depending on an associated load, and the broker can employ essentially any known technique to manage files stored therein. In another aspect of the invention, a reliable message instruction is employed within a controller to facilitate reliable messaging, and methods for facilitating reliable messaging with and/or within control environments are provided.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
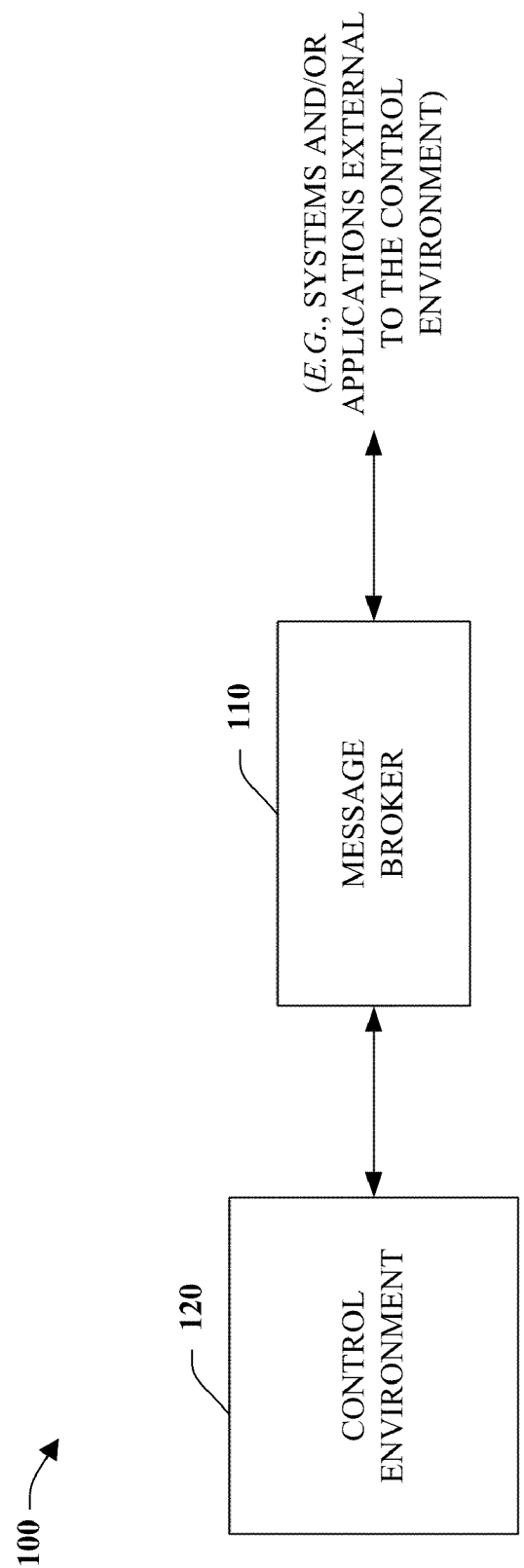
FIG. 1 illustrates an exemplary system that facilitates messaging with and/or within an industrial environment.

The systems and methods of the subject invention facilitate reliable messaging between control systems and/or components therein and between control systems and one or more entities external to a control environment. To provide for the foregoing, the systems and methods employ a component (e.g., a broker, a message broker . . . ) that decouples a message sender from a message recipient. Such component can receive and/or store messages, manage stored messages, dynamically morph to adjust to received messages, self-debug (e.g., diagnostics and recovery), and allow messages to be read, copied, and/or removed, for example. Thus, when a recipient of a message is unavailable (e.g., busy, inoperable, unresponsive . . . ), rather then failing the transmission and optionally re-sending the message, the message can be reliably stored and subsequently obtained by the recipient, as determined by the recipient. Thus, the systems and methods employ a mechanism that substantially ensures that a transmitted message is not simply aborted and/or does not have to be re-sent due to recipient availability. The foregoing can free processing cycles by decreasing overhead associated with determining whether a message needs to be re-sent and/or re-sending the message, and can substantially ensure that messages are transmitted and received via a reliable technique.

The subject invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As utilized in this application, terms "component," "system," "controller," "broker," and variants thereof are intended to refer to a computer-related entities, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

FIG. 1 illustrates a system 100 that facilitates messaging with and/or within an industrial automation environment. The system 100 includes a message broker 110, which provides a mechanism to reliably exchange messages (e.g., information, data, requests, queries, control signals . . . ) with a control environment 120. In one instance, the message broker 110 can provide for reliable messaging by behaving as a flexible data store. For example, any message transmitted by a component of the control environment 120 that is granted write and/or read privileges can be stored within and/or retrieved from the message broker 110. Likewise, any message transmitted to the control environment 120 by a component with write and/or read privileges can be stored within and/or retrieved from the message broker 110. Thus, transmission of a message can be independent of a state of a recipient (e.g., an entity external to the control environment 120 and/or one or more components of the control environment 120), and/or receipt of the message can be independent of a state of a sender (e.g., an entity external to the control environment and/or one or more components of the control environment 120); and, thus, messages can be reliably exchanged (e.g., synchronously or asynchronously) regardless of whether both the sender and the recipient are concurrently available to interact and/or exchange data.

This includes a 1 to 1 (1:1), 1 to many (1:n), or many to 1 (n:1) ratios of message senders and receives, and various levels of quality of service (QOS) including volatile messages like "fire and forget," which is send once with no guarantee of delivery, and move on up the QOS scale of delivery into non-volatile messaging such as send with guaranteed delivery, but may be sent or received multiple times, and on up to send once and only once with guarantee of delivery only once. As depicted, the message broker 110 resides outside the control environment 120. However, it is to be appreciated that the invention is not so limited. As described in detail below, a message broker can additionally and/or alternatively reside within the control environment 120 and/or within an industrial controller (not shown) of the control environment 120. In other instances, a broker can reside in connection with a Human Machine Interface (HMI), an I/O module, a bridge, an I/O block, etc.

It is to be appreciated that the external entities can include a state machine, a robot, a subscriber, a database, a server, a client, an integration server, an Enterprise Resource Planning (ERP), a Manufacturing Execution System (MES), and a Machine Control (MC) system. In addition, the external entities can include one or more business systems and/or applications. Such systems and/or applications can be associated with one or more integration servers (e.g., as described in detail below), middleware and/or other components that can communicate with the control environment 120. In addition, the control environment 120 can include an integration component (as described throughout the application) to facilitate communicating within and/or external to the control environment 120. Moreover, the sender of the message may or may not know that the message is routed through the message broker 110. For example, the sender can transmit a general broadcast and/or specify a destination. Upon transmission, the sender need not know that the message is received and/or stored within the message broker 110 before being conveyed to the destination. However, in some aspects of the invention, the sender knows the routing path is through the broker. For example, in one instance a controller can execute (e.g., invoke, instantiate an instance thereof . . . ) a reliable message instruction that determines the location of the broker 110, establishes a connection with the broker 110 (or uses a cached connection or pool of connections), delivers the message to the broker 110, and/or receives an acknowledgment from the broker 110 regarding the message transmission.

This approach can be utilized within a publish/subscribe and/or a polling based messaging system, for example. With a publish/subscribe based system, the message can be associated with one or more recipients, including any or all recipients subscribed to receive the message and/or read messages posted in a particular message storage region such as a topic, a queue, a mailbox, etc. The message broker 110 and/or other components can transmit an event and/or a notification to such subscribers (or a generic broadcast) to apprise them that a message has been posted, published, and establish, or utilize an connection with the subscriber and send them the data, queue the data until the subscriber is available again according to a retention policy, etc. Publishers and subscribers can maintain a connection to the broker 110, with subscribers pending on a specific message queue, or one to many information topic(s). In this case when a publisher posts a message to a queue or topic, all of the subscribers are immediately notified and may receive the actual message as part of the notification. Also, a subscriber can request the broker 110 provide a higher level of service and ask the broker 110 to queue the subscriber's messages if it is offline. With this type of service, a subscriber can be sure not to miss important messages even when the network connection is intermittent.

The publishers, subscribers and brokers can negotiate amongst each other to establish the most efficient and highest performance data transmission mechanism. Examples include choosing faster network links, aggregation of data messages (e.g., offer to produce 1 bigger message with two topics instead of 2 separate messages), and unicast or multicast, or broadcast messages when desirable, and redirection to higher performance servers. A client may request the broker 110 only send messages based upon a qualification, such as data change greater than 10%, send messages with a minimum time delay between transmissions, group multiple messages together in batches, delete unhandled messages after elapsed time (e.g., 24 hrs), forward to another queue after elapsed time (e.g. 10 minutes before forward to escalation queue or garbage), etc. One or more of the subscribers can concurrently and/or serially access the stored message. Such access includes, but is not limited to, reading, copying, modifying, removing, deleting, popping, etc. With a polling based system, the recipient can periodically poll the broker 110 to determine whether a message is available to be read and/or retrieved. In one instance, one or more of the recipients can concurrently and/or serially poll and access the stored message. In another instance, a point-to-point technique can be employed, wherein a recipient extracts, copies, removes, etc. a message from the broker 110. Utilizing the message broker 110 to facilitate message delivery can substantially guarantee that a transmitted message is received, at least by the message broker 110, and that a receiving entity can retrieve, obtain, receive, etc. the message, a copy of the message, a representation of the message, etc. from the message broker 110.

The control environment 120 can include one or more control systems (not shown), wherein respective control systems can include one or more industrial controllers (not shown) that can control various plants, machines, apparatuses, processes, systems, equipment, etc. In addition, the one or more industrial controllers (e.g., associated with integration components, as described in detail below) can execute one or more intelligent agents and/or control logic (e.g., programs, routines, instruction sets, and the like, programmed in industrial and/or other languages) to control the various plants, machines, apparatuses, processes, systems, equipment, etc. Such control can include an ability to obtain and/or analyze inputs and/or generate outputs that effectuate the controlled plants, machines, apparatuses, processes, systems, equipment, etc. Furthermore, the one or more controllers can include one or more receiving, transmitting and/or transcieving components (not shown), which can facilitate exchanging messages. Moreover, the message broker 110 and/or any of the components of the control environment 120 can be hardware, software and/or firmware based. For example, industrial controllers within the control environment can be soft (e.g., software implemented) and/or physical controllers (e.g., hardware with suitable software and/or firmware), include Ethernet interfaces or interface with Ethernet interfaces over backplane or other network connections, human machine interface and I/O module devices, and/or a combination thereof.

Furthermore, the control environment 120 can be associated with essentially any communications protocol. For example, at least the following protocols can be supported: Control and Information Protocol (CIP) protocols for communicating via DeviceNet, ControlNet, EtherNet/IP and/or Controller Area Network (CAN), fieldbus protocols for communicating via Profibus, Interbus-S, RIP, P-Net, and AS-i, Transport Control Protocol (TCP) and Internet Protocol (IP) for communicating via the Internet, NetBios Extended User Interface (NetBEUI) for communicating via Large and Wide Area Networks (LANs and WANs), File Transfer Protocol (FTP) for communicating with workstations, servers and the like, Hyper Text Transfer Protocol (HTTP) for communicating via the World Wide Web (WWW), etc. In addition, communication with the message broker 110 can be through wire and/or wireless communication techniques. Examples of communications schemes that can be employed in accordance with the subject invention include Ethernet, serial port, parallel port, coaxial cable, Infrared (IR), BlueTooth, Universal Serial Bus (USB), Firewire, WiFi, WiMax, 802.11 A,B,G, 802.15.4, Universal Plug and Play (UPnP), Ultra WideBand (UWB) and the like. Examples of suitable communications mediums include category 1-5 wire (e.g., CAT5 UTP 8-wire cable), coaxial cable, USB, RS-232, RS-485 . . . .

Moreover, the messages broker 110 can be memory and/or some other medium that can store information. By way of illustration, and not limitation, the broker 110 can include nonvolatile and/or volatile memory or storage. Suitable nonvolatile memory can include read only memory (ROM), programmable ROM (PROM), electrically programmable ROM (EPROM), electrically erasable programmable ROM (EEPROM), battery backed RAM, MRAM or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), battery backed RAM. Storage can include disk drives, both mechanical and solid state such as SATA/IDE/SCSI disk drives, micro drives, USB and compact flash devices, and remote storage like network file system (NFS), common internet file system (CIFS) shares, storage area networks (SAN), network attached storage (NAS), and iSCSI interfaces, for example.

Figure 2:
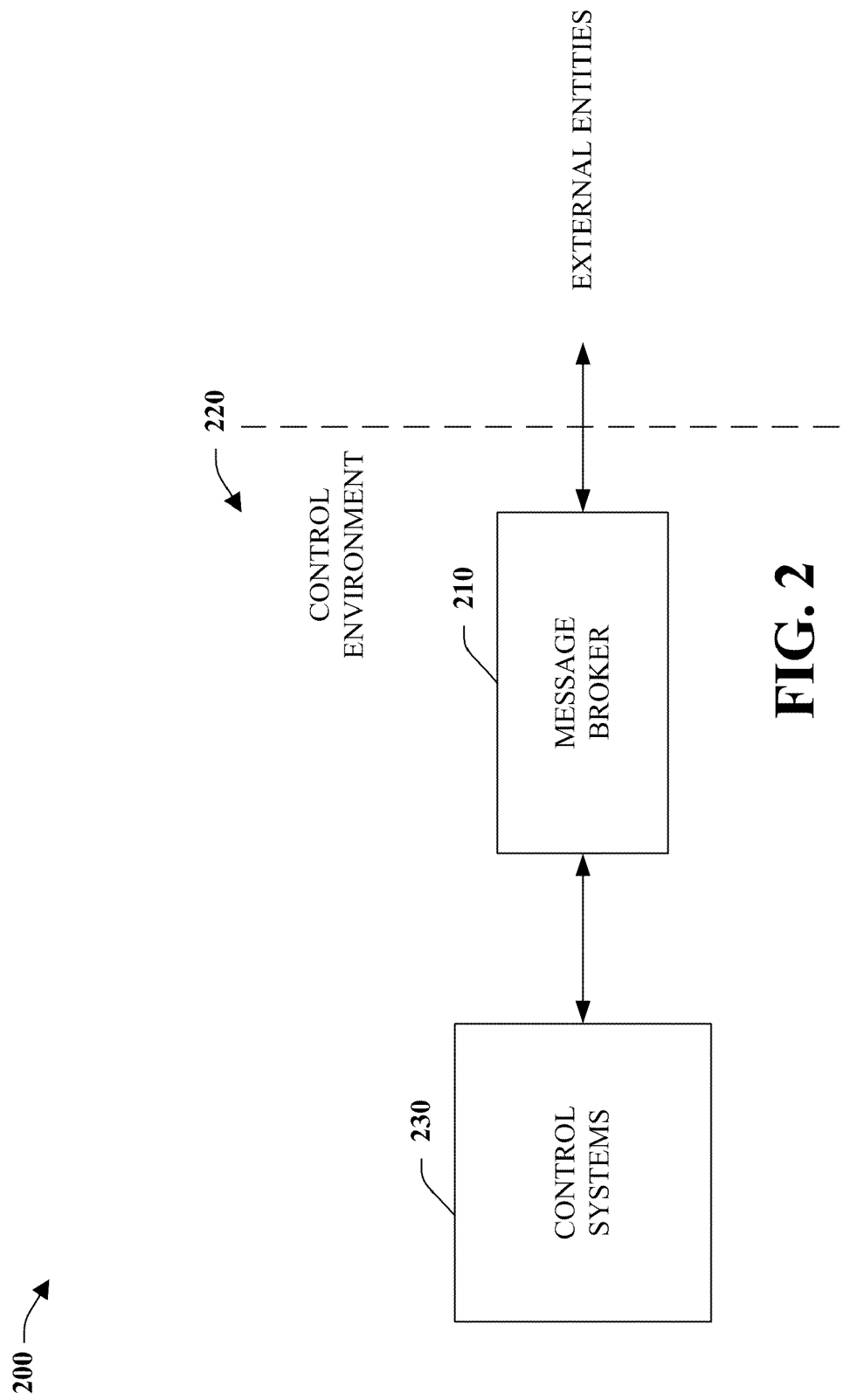
FIG. 2 illustrates an exemplary system that facilitates messaging with one or more control systems of a control environment.

FIG. 2 illustrates a system 200 that facilitates messaging between one or more control systems of a control environment and external systems such as, for example, business systems and/or applications (and/or an integration server(s) associated therewith). The system 200 includes a message broker 210, which provides a mechanism to reliably exchange messages (e.g., information, data, requests, queries, control . . . ). As depicted, the message broker 210 resides within a control environment 220 and facilitates communication (e.g., message exchange) between one or more control systems 230 ("control systems 230") and one or more external entities such as, for example, business systems and/or applications. In other instances, the broker 210 can reside within one or more controllers (or HMI, network interface, or I/O device) (not shown) of the control systems 230 of the control environment 230 and/or one or more control systems (not shown) associated with another control environment (not shown). The message broker 210 can provide for reliable messaging between the control systems 230 and the external entities. For example, any message transmitted by any of the control systems 230 and/or the external entities can be stored within and/or retrieved from the message broker 210. Therefore, message transmission can be independent of a state of a recipient, and/or message receipt can be independent of a state of a message sender. Thus, employing the message broker 210 can provide for reliable asynchronous and/or synchronous message exchanged that can mitigate tracking whether messages are received and/or re-sending messages that failed to reach their destination.

As depicted, the message broker 210 can be utilized as an interface between the control systems 230 and the external entities. In many instances, data associated with the control environment 220 can be leveraged by such external entities. By way of example, a Purchasing Department may desire to obtain a real-time inventory of components that are used to build widgets and/or a count of a number of widgets produced at any given time. Conventionally, Purchasing Department personnel would establish some form of contact (e.g., via telephone, writing, in-person . . . ) with the Manufacturing Department to ascertain such information. However, the information provided typically is not real-time and may be incorrect only moments later when the next widget is produced. In some instances, personnel from the Manufacturing Department may not be available at the time of the request. This can introduce a delay from the time of the request to when, if at all, the Purchasing Department receives such information.

An alternative approach is to establish communication with the control environment 220 through middleware software, which, in general, is specialized software and/or hardware. Middleware can add cost and delays, and typically provides a limited set of functionality. In addition, middleware commonly is designed around a particular family of controllers and, therefore, usually is not be compatible across controllers. The external entity can request or retrieve information from the control environment and/or push information thereto. However, the control environment 220 and/or one or more components therein may not be available to receive and/or transmit a communication, or otherwise be accessed. For example, the environment 220 may be down for maintenance, unable to answer requests during operation, in an unknown state, powered down, etc. Conventionally, when an attempt to exchange information is made during such events, the exchange typically cannot succeed and is aborted, and the requesting entity can optionally re-submit the request. Likewise, the control environment 220 can request or obtain information from and/or push information to an entity external to the control environment 220. This recipient entity may be unavailable. For example, the recipient may be powered down, or, where human interaction is required, the human may be absent.

In addition, another system may not wish to receive messages at a rate the automation application is sending them. The broker 210 acts as a message aggregator, and the upper layer applications can service the queues and topics when desired handling messages in batches. With conventional approaches, when an attempt to exchange information is rendered during such events, the message transmission fails and the control environment 220 can attempt to exchange the data at a later time. As previously noted, the message broker 210 can be utilized regardless of a state of a message recipient, which can substantially guarantee that a message transmission is successful (e.g., at least the transmission to the message broker 210), and that a receiving entity can retrieve, obtain, receive, etc. the message, a copy of the message, a representation of the message, etc. from the message broker 210 regardless of the state of the message sender.

Figure 3:
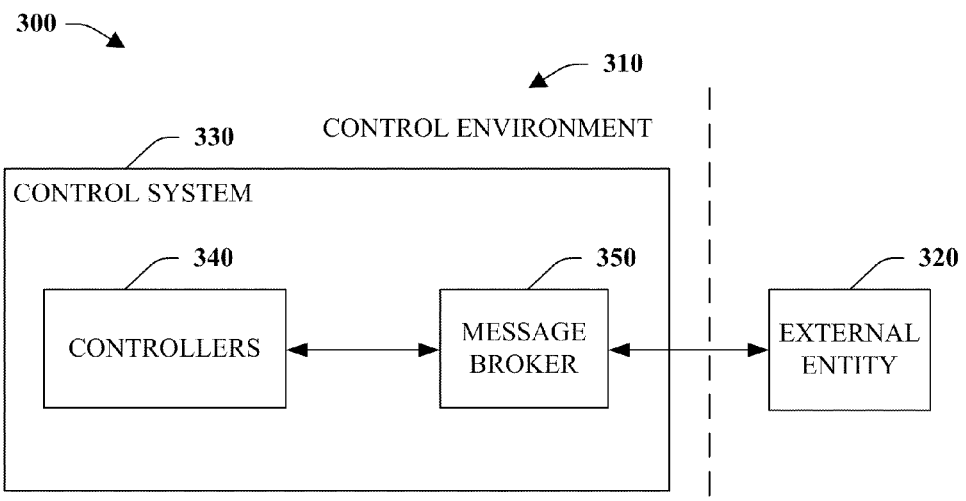
FIG. 3 illustrates an exemplary system that facilitates reliable messaging between a control environment and an entity that resides external to the control environment.

FIG. 3 illustrates a system 300 that facilitates reliable messaging between a control environment 310 and an entity 320 that is external to the control environment 310. The control environment 310 includes a control system 330 with one or more controllers ("controllers") 340 and a message broker ("broker") 350. The controllers 340 are industrial controllers (e.g., soft and/or hard Programmable Logic Controllers (PLCs)) that execute programs (e.g., control logic, routines, instructions . . . ) and, optionally, intelligent agents to control plants, machines, processes, equipment, systems, etc. The entity 320 can be associated with business systems and/or applications, an Enterprise Resource Planning (ERP) system, a Manufacturing Execution System (MES), a Machine Control (MC) system, and the like The broker 350 can be utilized as a reliable messaging mechanism for messages (e.g., requests, data, queries, control signals, parameters, variables, I/O, notifications, acknowledgements . . . ) conveyed between the control environment 310 and the entity 320. By way of example, at least one of the controllers 340 can transmit a message to the external entity 320 ("entity 320"). The message can be routed to the entity 320 through the broker 350. Such transmission may be to the entity 320, wherein it is routed through the broker 350 and/or conveyed (e.g., posted, published . . . ) in the broker 350. It is to be appreciated that a mechanism can be employed to verify the message has been received by the broker 350. For example, an acknowledgement (e.g., ACK) or non-acknowledgement (e.g., NAK) can sent back to at least one of the controllers 340 to notify that controller(s) that the posting was successful or unsuccessful, respectively. In addition, a notification indicating the message was received can be unicast, broadcast, and/or multicast to any or all components listening. In one aspect of the invention, such notification can be conveyed to entities (e.g., the entity 320) subscribed to any and all messages stored in the broker 350 and/or messages transmitted by the at least of one the controllers 340.

Subscribed entities (e.g., the entity 320) can read, remove, extract, modify, copy, etc. the message. Publish and Subscribed entities can present the broker 350 with a policy defining notification preferences/rules/policy. Examples of these policy rules include requests the broker only notify the client on a specific value, a delta change, dead-band, message inhibit time or rate to throttle messages, inactivity message, when a device connects or break connection with a queue, or forward the subscriber to another broker for future messaging service. The publisher or subscriber can interrogate the broker for status information to discover performance, uptime, next scheduled maintenance or service level agreements, etc. In another instance, entities (e.g., the entity 320) can poll the broker 350 to determine whether a message is stored in the broker 350, and read, remove, extract, modify, copy, etc.

available messages. The subscriber may request the broker 350 queue messages in the event the subscriber breaks the connection with the broker 350.

A publisher or the broker 350 may determine an optimized publishing or data delivery scheme, and notify subscribers by redirection to a new server, queue, or topic. The new server, queue, or topic may have higher performance, recent maintenance, redundant or an optimization or aggregation of messages already being produced. A supervisory application interacting with the broker 350, subscriber, and/or publisher may decide to combine two separate XML messages in to a single multicast XML message knowing the publisher and subscribers can understand the new XML message and obtain the desired data. Once example is a subscriber requests 2 topics, the message revision queue, and the message data queue. Each time the publisher wants to change the message format, it can publish a new schema to the message revision queue, and the subscribers know the next data message received will be in the new format. Another example is the data message may include attachments and MIME type encoding with revision information describing the accompanying binary data, or simply a XML document with revision information, pointers to schemas, etc.

Storage within the broker 350 can be independent of a state of the entity 320 or any other entity with privileges to access the broker 350. Thus, the entity 320 does not have to be available in order for a message to be successfully transmitted by the at least one of the controllers 340. For example, the entity 320 can be powered down, in an unknown state, in an error state, under maintenance, etc. With conventional techniques, if a message recipient is unavailable, the message typically is aborted and has to be re-sent at a later time. The broker 350 can mitigate message abortions under such circumstances by ensuring the message is received regardless of the state of the entity 320. The entity 320 can obtain (e.g., retrieve, read, copy, review . . . ) the message from the broker 350 at a later time. Moreover, retrieval of the message can be independent of a state of the at least one of the controllers 340 or other component posting messages. For example, the at least one of the controllers 340 can be powered down, in an unknown state, in an error state, under maintenance, etc. Thus, the broker 350 can also ensure that messages can be retrieved regardless of the state of the message sender.

The broker 350 can be dynamic in nature in that its storage size and/or capacity can increase and/or decrease depending on an associated load, which can correspond to a number of messages received for a given time period (e.g., a rate), an aggregate number of messages stored within the broker 350, a number of anticipated (e.g., inferred) messages that will be received, etc. In addition, it is to be appreciated that one or more messages can be concurrently and/or serially posted to and/or obtained from the broker 350. In another example, the broker 350 can be static, wherein messages stored therein can be managed on a first in first out (FIFO) basis, a first in last out (FILO) basis, an expiration time, etc. Moreover, the broker 350 can be associated with a security mechanism that provides for authentication and/or authorization of message senders and/or retrievers. Thus, the identity of the message sender and/or reader can be determined, and the sender and/or reader can be provided with access to the broker 350 based on corresponding privileges (e.g., read, write . . . ). Security mechanisms include SSL, SASL, Kerberos, LDAP, NTLM, Active Directory and other standard authentication mechanisms. Furthermore, messages conveyed to, stored in, and/or obtained from the broker can be variously protected and/or formatted. For example, the messages can be encrypted, digitally signed, encoded, compressed, password protected, associated with read, write and/or execute attributes, etc.

Figure 4:
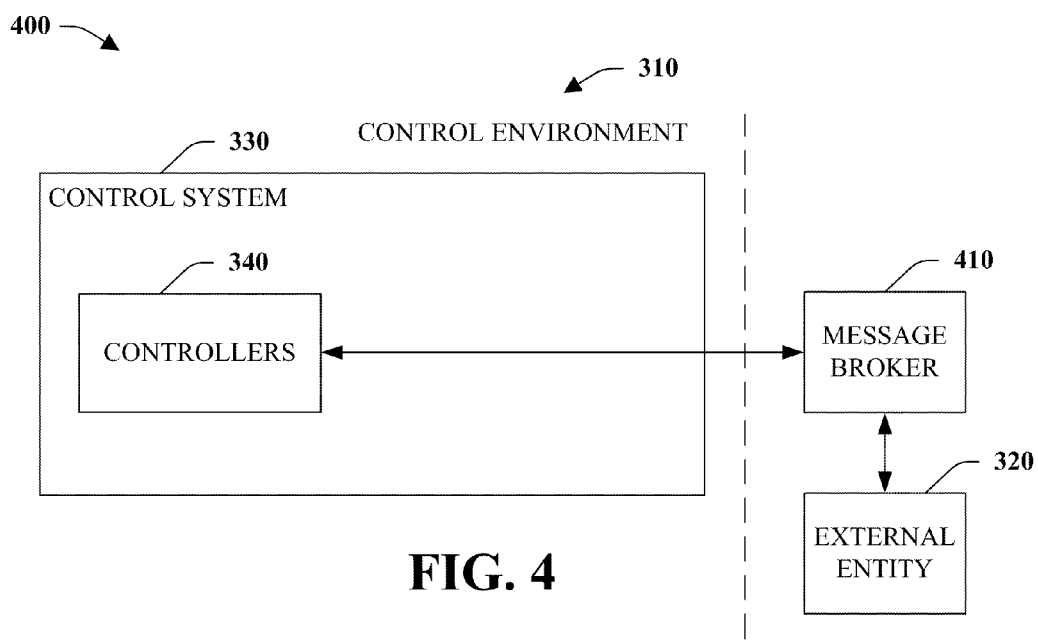
FIG. 4 illustrates an exemplary system that facilitates reliable messaging with a control environment through a broker residing therein.

FIG. 4 illustrates a system 400 that facilitates reliable messaging between the control environment 310 and the entity 320. In contrast to the system 300 of FIG. 3, a broker 410 is located outside of the control environment 310. However, the broker 410 can be utilized in a substantially similar manner as the broker 350. Thus, the broker 410 can be utilized to facilitate reliable messaging between the control system 330 and the entity 320. As described above, any or all of the controllers 340 can concurrently and/or serially transmit messages to the entity 320, wherein such messages are stored in the broker 410, and obtained from there by the entity 320. Thus, message transmission and receipt can be independent of states of the entity 320 and the controllers 340, respectively. The controllers 340 can successfully deliver or receive messages when the entity 320 is unavailable, and the entity 320 can retrieve messages when the controllers 340 are not available for interaction. This provides for novel improvements over conventional systems where message delivery fails if the recipient is unavailable. Thus, the broker 410 can substantially ensure that messages are conveyed in a reliable manner.

Figure 5:
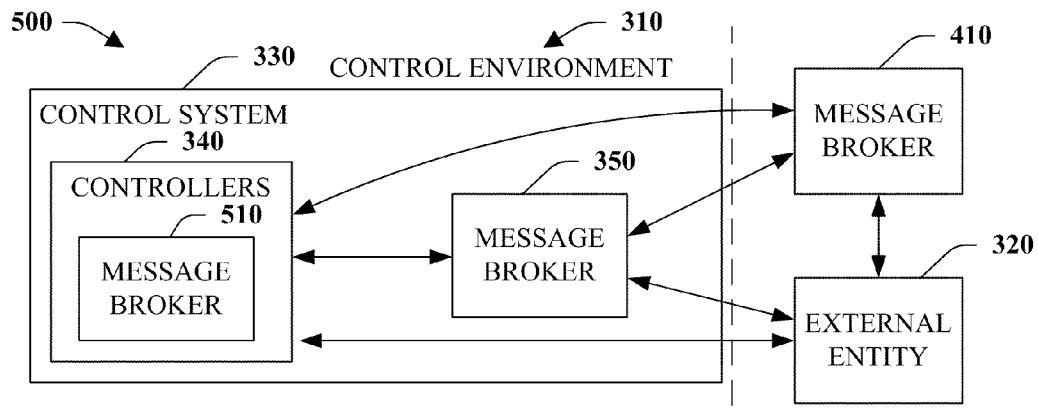
FIG. 5 illustrates an exemplary system that facilitates reliable messaging with a control environment through a broker residing within a controller.

FIG. 5 illustrates a reliable messaging system 500 with the internal broker 350 and the external broker 410. With this configuration, the broker 350 can be utilized as described in connection with the system 300 of FIG. 3 and/or the broker 410 can be utilized as described in connection with the system 400 of FIG. 4. In addition, both brokers 350 and 410 can be concurrently employed. For example, the broker 350 can be configured with respect to the control system 330, whereas the broker 410 can be configured with respect to the entity 320. Thus, the brokers 350 and 410 can be associated with disparate security mechanisms, utilize different file structures, employ distinct management techniques, support similar and/or different communication protocols, etc. For example, the broker 350 can provide adapters, connectors, etc. to exchange messages between the controllers 340 and a plant, process, machine, equipment, apparatus, etc. under control thereof. In one example, the broker 410 may not support such adapters, connectors, etc., and, thus, the entity 350 can obtain such information through the controllers 340, wherein the broker 410 supports communication with the controllers 340 to obtain such information. The foregoing is an example that illustrates one possible difference between brokers 350 and 410. However, it is to be understood that in other aspects of the invention, the broker 350 and 410 can interact with substantially similar components or various other differences can exist. In addition, in accordance with another aspect of the invention, the brokers 350 and 410 can communicate with each other. Such communication can be through the brokers 350 and 410 themselves and/or the controllers 340 and the entity 350, respectively.

In addition, the controllers 340 can include a message broker ("broker") 510. It is to be appreciated that the broker 510 can be a single broker shared by one or more controllers of the controllers 340; multiple brokers either shared or dedicated to respective brokers of one or more controllers of the controllers 340; and/or one or more distributed brokers. Similar to the brokers 350 and 410, the broker 510 provides for reliable messaging between the controllers 340 and the entity 320. Thus, the any or all of the controllers 340 can reliably convey messages to the entity 320 through the broker 510, wherein such messages can be stored in the broker 510 regardless of a state of the entity 320, and stored messages can be obtained from the broker 510 by the entity 320 regardless of a state of the controllers 340. As noted previously, this can provide for novel improvements over conventional systems where message delivery halts if the recipient is not available. Thus, the broker 510 can ensure reliable message transfer.

Figure 6:
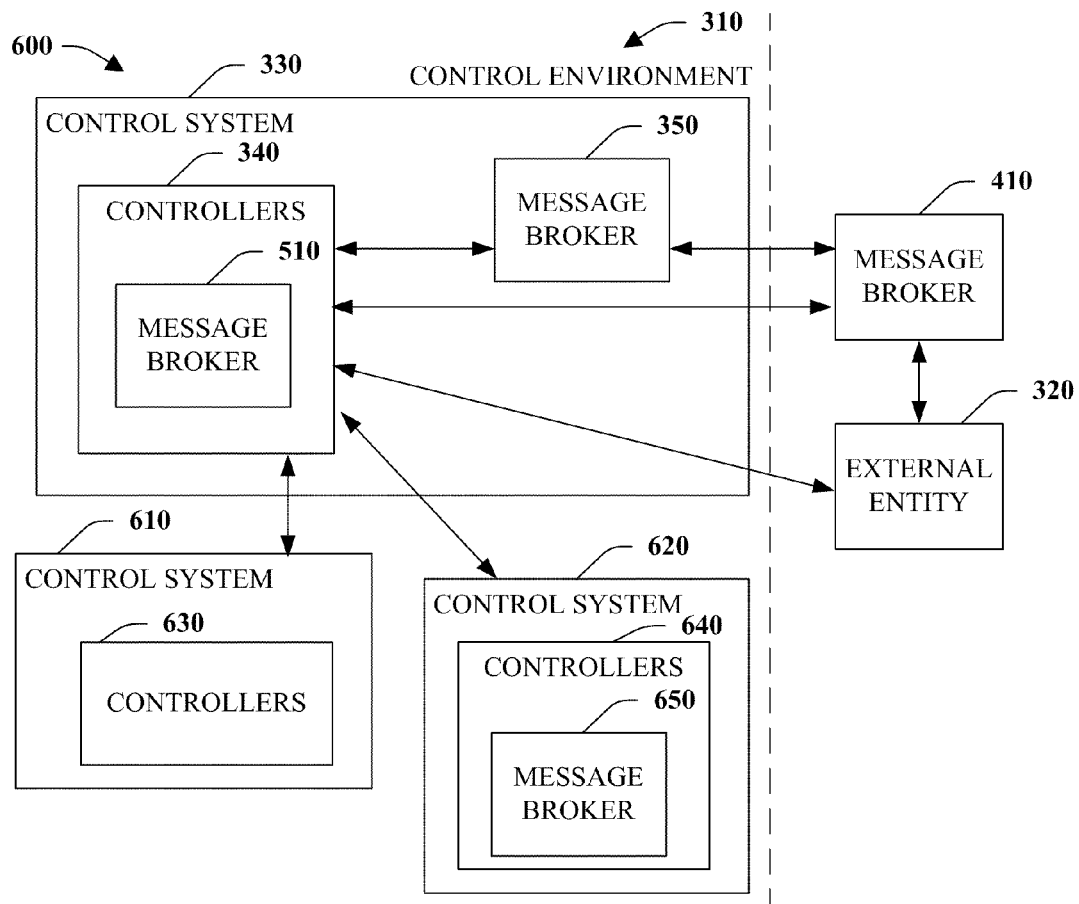
FIG. 6 illustrates an exemplary system that facilitates reliable messaging amongst control systems and external entities.

FIG. 6 illustrates a system 600 wherein the control environment 310 includes more than one control system, and the control systems can communicate with each other through message brokers. The system 600 includes the broker 350, the broker 410, and the broker 510, all of which can provide for communication as described in connection with the system 300 of FIG. 3, the system 400 of FIG. 4 and/or the system 500 of FIG. 5. The system 600 further includes a control system 610 and a control system 620. The control system 610 includes one or more controllers 630 ("controllers 630"). The controllers 630 can be behave substantially similar to the controllers 340 in terms of utilizing a reliable messaging approach for exchanging information. For example, the control system 610 can include a dedicated broker (not shown) that is substantially similar to the broker 350 and/or an internal broker (not shown) that is substantially similar to the broker 510.

In addition, the control system 610 can utilize a messaging broker associated with another control system. By way of example, any or all of the controllers 630 can employ the brokers 350 and/or 510 to reliably convey messages to the control system 330 and/or the entity 320. Likewise, the control system 330 and/or the entity 320 can convey messages to the control system 610 via the brokers 350 and/or 510. The control system 620 includes one or more controllers 640 ("controllers 640"), which can behave substantially similar to the controllers 340 in terms of utilizing a reliable messaging approach for exchanging information. For example, the controllers 640 include a broker 650, which can be substantially similar to the broker 510. In addition, the control system 620 can utilize a messaging broker associated with another control system such as, for example, the brokers 350 and/or 510 of the control system 330, and the control system 330 and 610 and/or the entity 320 can convey messages to the control system 620 via the brokers 350 and/or 510.

Figure 7:
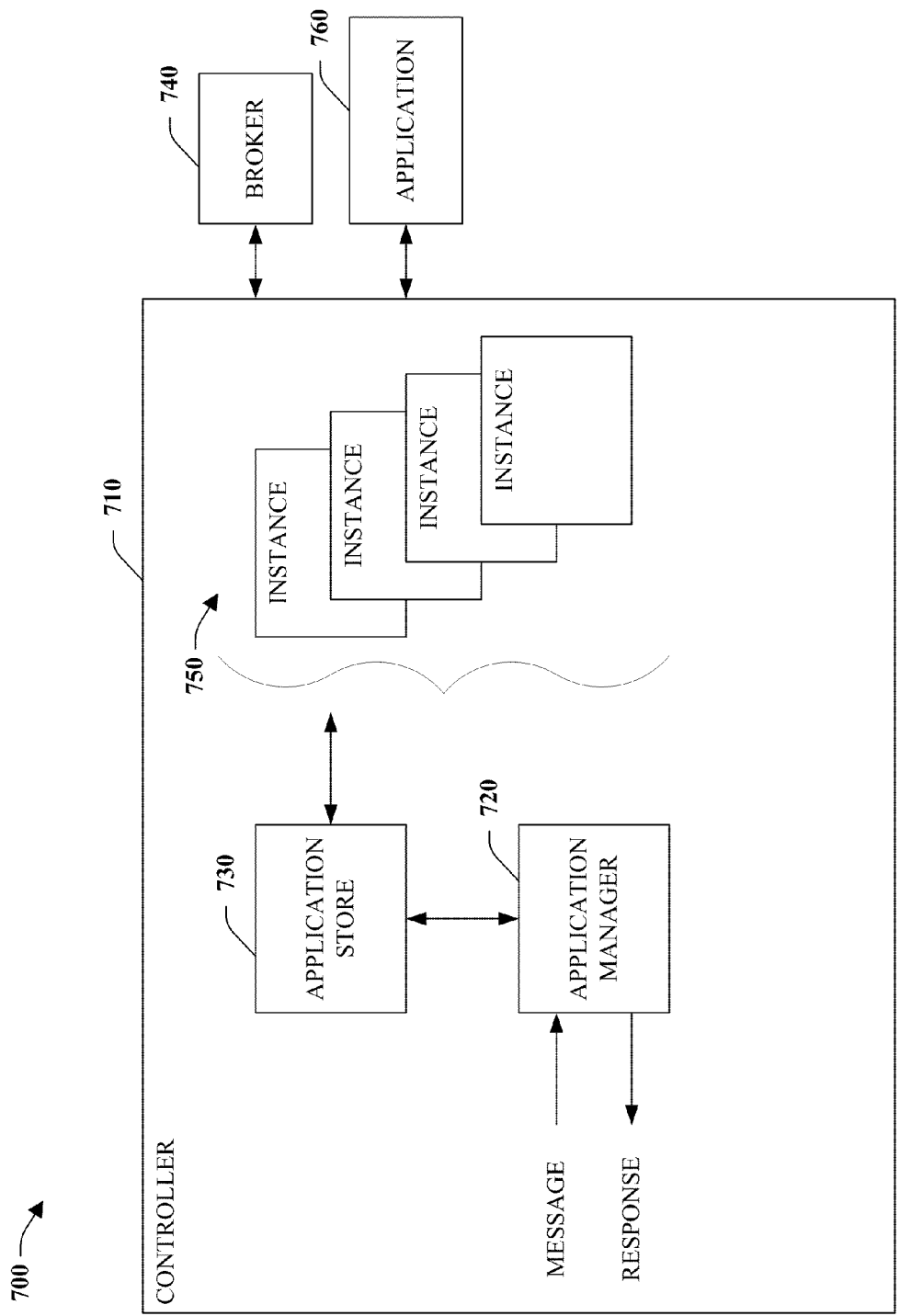
FIG. 7 illustrates an exemplary controller that employs a reliable message instruction that facilitates reliable messaging.

FIG. 7 illustrates an exemplary technique 700 that facilitates implementing reliable messaging. The system 700 includes a controller 710, which can be a soft and/or a hard controller (HMI, I/O device, or network interface) that executes instructions (e.g., control logic, routines, programs . . . ) and, optionally, at least one intelligent agent to control plants, machines, processes, equipment, systems, etc. The controller 710 can include applications for reliable messaging configured and managed by supervisory software or user configuration. These applications can interact with the controller 710 to send and received messages between the controller 710 and message oriented middleware, located on the controller 710 and/or to a broker 740 and/or an application 760. Another technique employed by the controller 710 can leverage interprocess communication mechanisms, like standard I/O (e.g., stdin, stdout, stderr), named pipes, queue, file descriptor, Common Gateway Interface (CGI) & fastCGI, sockets, Java Native Interface (JNI) interface etc, to facilitate reliable messaging.

By way of example, the controller 710 can write a message to a standard input of an application launched by an application management framework 720. The controller 710 can instantiate message publishers and subscribers with the application management framework. The application management or application itself can create named pipes and use these pipes for interprocess communication between the controller and the application. For example, the controller 710 can desire to send data to a card in a particular slot. For instance, the message to the application management framework could be "start a reliable messaging application "rm.exe" or "java jms" with these configuration parameters, and use it to send data to a card on slot 5, or connected to a remote broker or remote device or application." These applications can be downloaded to the controller, incorporated into the firmware, accessible via networked interfaces or provided by a Java or .NET Framework execution engine, or provided as web services and discovered through UDDI lookups.

The application manager 720 can aggregate this message along with a path (e.g., a URL, a link . . . ) to an application (e.g., a reliable messaging application and/or instruction) that can be utilized to carry out the request, for example, an application stored within an application store 730, and a path (e.g., an address, a link, an IP address . . . ) to the broker 740 that can be utilized as a reliable means to send the data. In addition, the application manager 720 or operating system can instantiate one or more instances 750 of such applications. Respective instances 750 can establish a connection with the broker 740, and deliver the message to the broker 740 regardless of a state of a destination(s) of the message. Successful delivery of the message to the broker 740 can elicit an acknowledgement, a message, a signal, and/or other form of notification to the controller 710.

Figure 8:
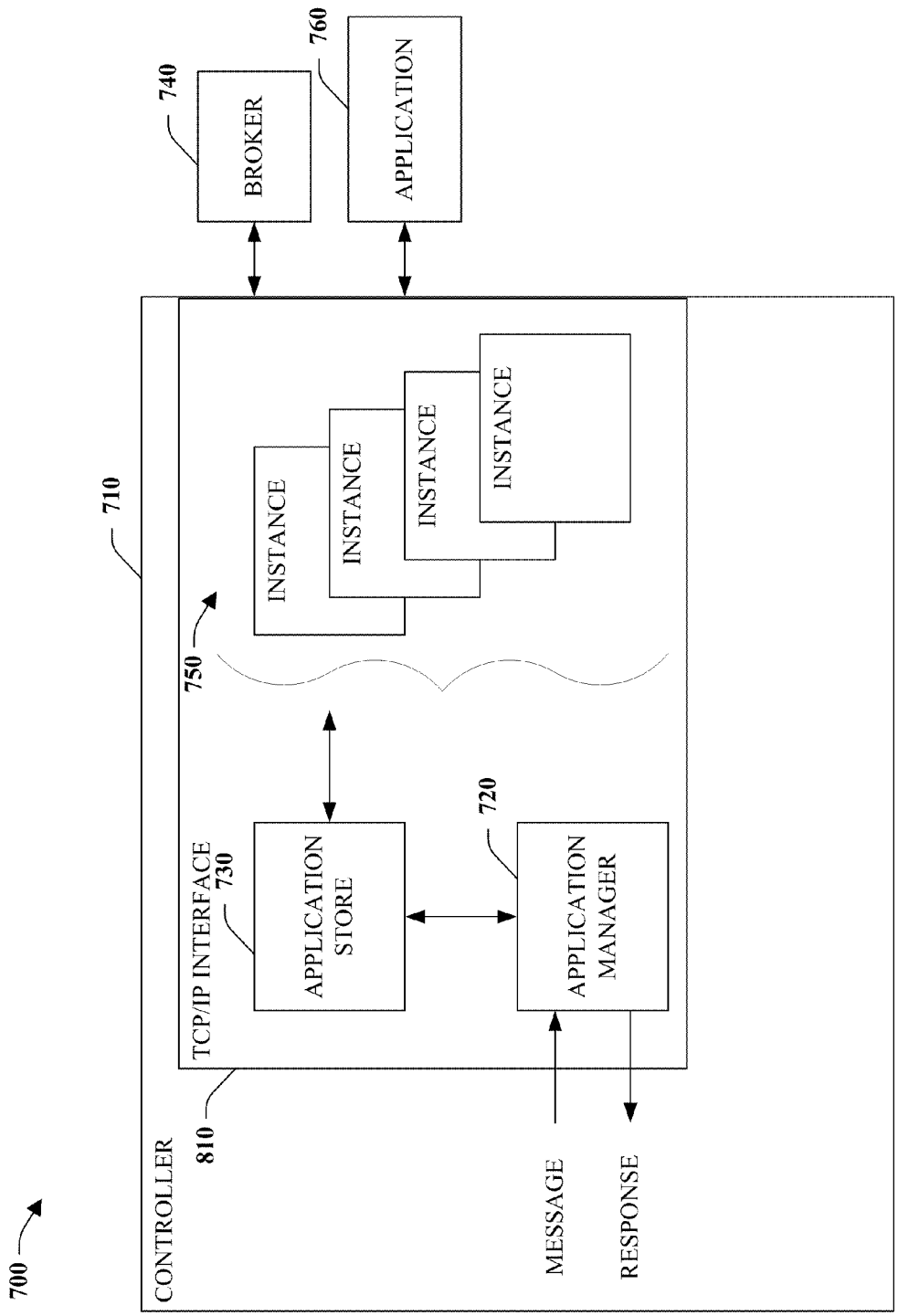
FIG. 8 illustrates an exemplary controller that employs a TCP/IP based component to execute a reliable message instruction that facilitates reliable messaging.

Such notification can be facilitated by the application manager 720, one or more of the instances 750, and/or other mechanisms. Moreover, a response can be provided to the controller through a standard output such as stdout of the reliable messaging application, an invoked function's return value, a named pipe, a queue, a socket, a web service, a file handle, a remote procedure call, a Java Native Interface (JNI) interface, a Common Gateway Interface (CGI) & fastCGI, and/or other interprocess communication mechanism, for example. In another example, these components and a similar approach can be utilized to retrieve data stored within the broker 740 and/or an application 760. For example, this approach can be utilized to download and/or upload applications, control logic, intelligent agents, firmware, diagnostics, history logs, etc. FIG. 8 illustrates the exemplary technique 700, wherein the application manager 720, application store 730 and/or the instances 750 reside within a TCP/IP (e.g., Ethernet) module 810 of the controller 710.

Figure 9:
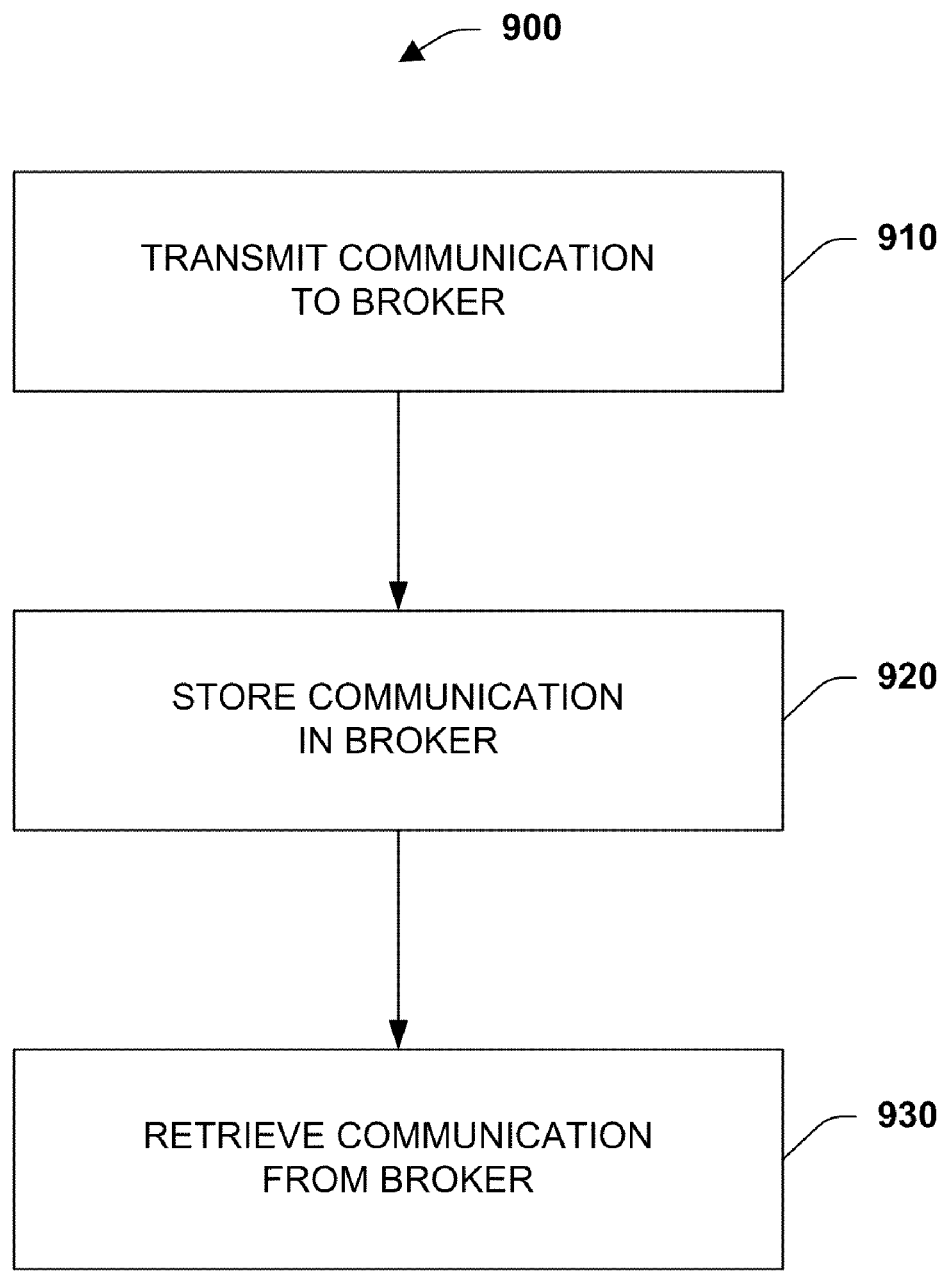
FIG. 9 illustrates an exemplary methodology for reliable messaging in connection with a control environment.
Figure 10:
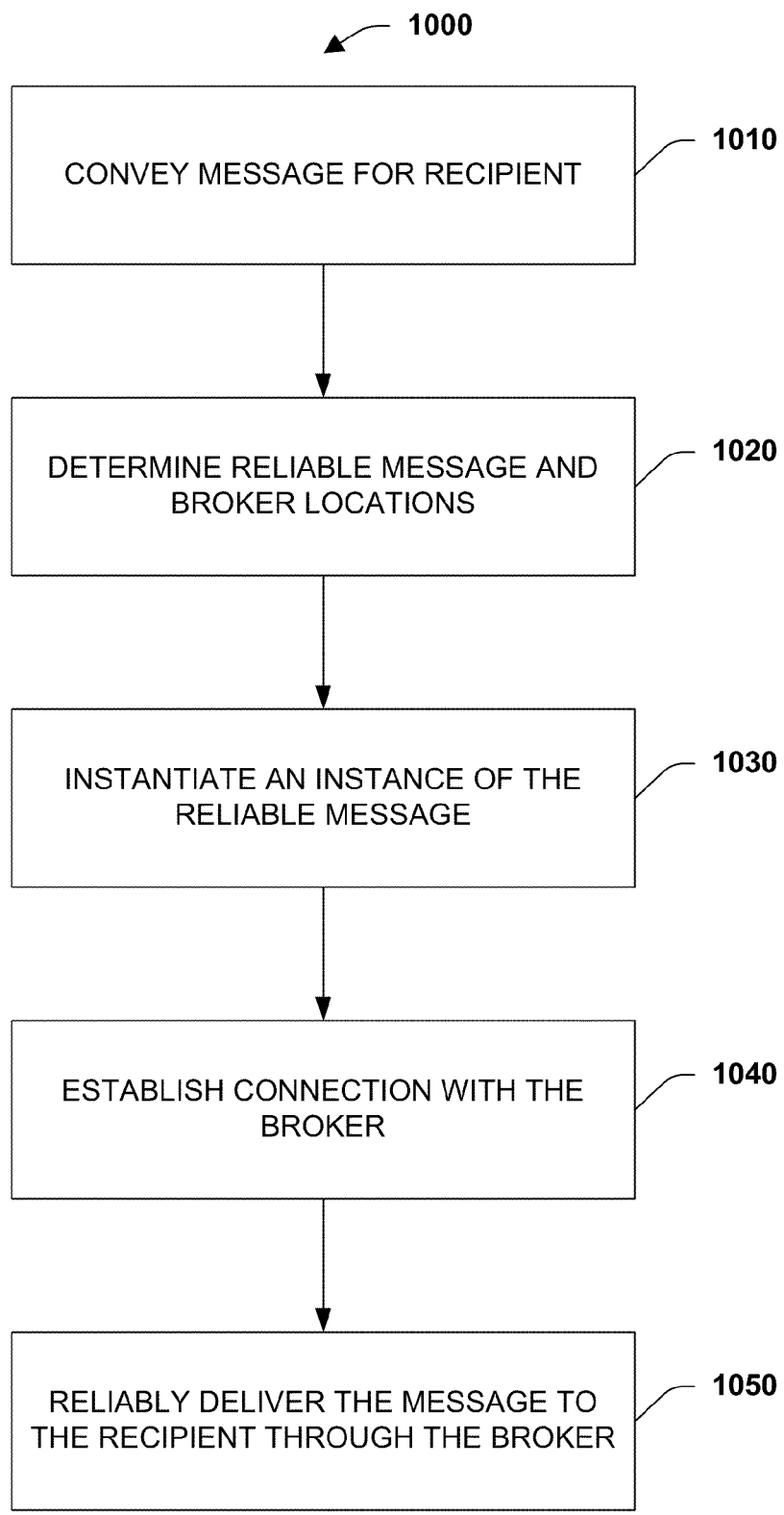
FIG. 10 illustrates an exemplary methodology for executing a reliable messaging instruction to facilitate reliable messaging in connection with a control environment.

FIGS. 9-10 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 9 illustrates a methodology 900 that facilitates reliable messaging with and/or within a control environment. Such environments typically include one or more control systems with one or more industrial controllers (e.g., hard and/or soft), wherein respective control systems can be utilized to control various plants, machines, apparatuses, processes, systems, equipment, etc. It is to be appreciated that the one or more industrial controllers can execute one or more intelligent agents and/or control logic (e.g., programs, routines, instruction sets, and the like, programmed in industrial and/or other languages) to control the plants, machines, apparatuses, processes, systems, equipment, etc. Such control can include the ability to obtain and/or analyze inputs and/or generate outputs that effectuate the controlled plants, machines, apparatuses, processes, systems, equipment, etc. Moreover, the one or more controllers can employ one or more integration components (as described in detail below) to facilitate communication with entities internal and/or external to a corresponding control system.

At reference numeral 910, a communication (e.g., a message, a signal, a notification, an event, a request, a query, data, information . . . ) is conveyed to a broker. Such communication can originate within a controller of the control environment and be destined for another controller and/or external entity, and/or originate within an entity outside of the control environment and be destined for one or more controllers within one or more control systems of a control environment. The communication can be for a particular recipient and/or destination or a general broadcast. For instance, the communication can be for a controller(s), a business system(s), an application(s), an MES(s), an ERP(s), an MCS(s), etc. It is to be appreciated that the control environment can support various communications protocol such as Control and Information Protocol (CIP) protocols for communicating via DeviceNet, ControlNet, EtherNet/IP and/or Controller Area Network (CAN), fieldbus protocols for communicating via Profibus, Interbus-S, RIP, P-Net, and AS-i, Transport Control Protocol (TCP) and Internet Protocol (IP) for communicating via the Internet, NetBios Extended User Interface (NetBEUI) for communicating via Large and Wide Area Networks (LANs and WANs), File Transfer Protocol (FTP) for communicating with workstations, servers and the like, Hyper Text Transfer Protocol (HTTP) for communicating via the World Wide Web (WWW), etc. Examples of suitable wire and/or wireless communications schemes that can be employed in accordance with an aspect of the subject invention include Ethernet, serial port, parallel port, coaxial cable, Infrared (IR), BlueTooth, Universal Serial Bus (USB), Firewire, WiFi, WiMax, and the like. Examples of suitable communication medium include category 1-5 wire (e.g., CAT5 UTP 8-wire cable), coaxial cable, USB, RS-232, RS-485 . . . .

At 920, the communication can be stored within a broker. As discussed previously, a broker (as utilized herein) can provide for reliable messaging. Thus, essentially any communication transmitted by a component in a control environment can be stored within and/or retrieved from the broker, and any communication transmitted to the control environment can be stored within and/or retrieved from the broker. Thus, transmission of a communication can be independent of a state of a recipient, and/or receipt of the message can be independent of a state of a sender. It is to be appreciated that some form an acknowledgement can be provided to the sending entity to notify such entity that the communication transmission was successful. For example, an ACK or NAK can sent to indicate whether the posting was successful or unsuccessful. In addition, a notification indicating the message was received at the broker can be unicast, broadcast, and/or multicast to any or all components listening, or queued for components that are currently offline, but requested to broker store their messages until they are back online.

At 930, the communication stored within the broker can be accessed. Suitable access includes, but is not limited to, reading, copying, modifying, duplicating, and removing the communication. The communication can be discovered through various mechanisms such as eventing, polling and/or subscribing to the broker and/or component that conveyed the communication. In addition, the notification can be publicly and/or privately broadcast to all entities with privileges to listen. Moreover, security can be employed to mitigate malicious access to the communication. Such security can include authenticating, verifying, validating, authorizing the communication publisher and/or subscriber prior to accepting a communication and/or allowing access to a communication. It is to be appreciated that the broker can be memory or some other medium that can store information. By way of illustration, and not limitation, the broker can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), MRAM, and battery backed RAM.

FIG. 10 illustrates a methodology 1000 that facilitates reliable messaging with and/or within a control environment. At 1010, a controller can convey a message. Such message can be transmitted through a standard input port and received by an application manager object. At 1020, the application manager object can determine a path to an application that can be utilized to handle the message and/or a path to the broker. At reference numeral 1030, an instance of a reliable messaging application can be instantiated. The message and path to the broker can be provided to the object, for example, through a constructor or other mechanism that can be utilized to set parameters and variables. At 1040, the instance can establish a connection with the broker. It is to be appreciated that the broker can be internal and/or external to the controller. At 1050, the message or messages can be delivered to the broker. Upon receiving the message, the broker can provide some indication that the message was successfully received and stored to the transmitting device. The broker can provide for decoupling a message sender from a message recipient such that messages can be successfully transmitted regardless of a state of the recipient, and messages can be retrieved regardless of a state of the sender.

Figure 11:
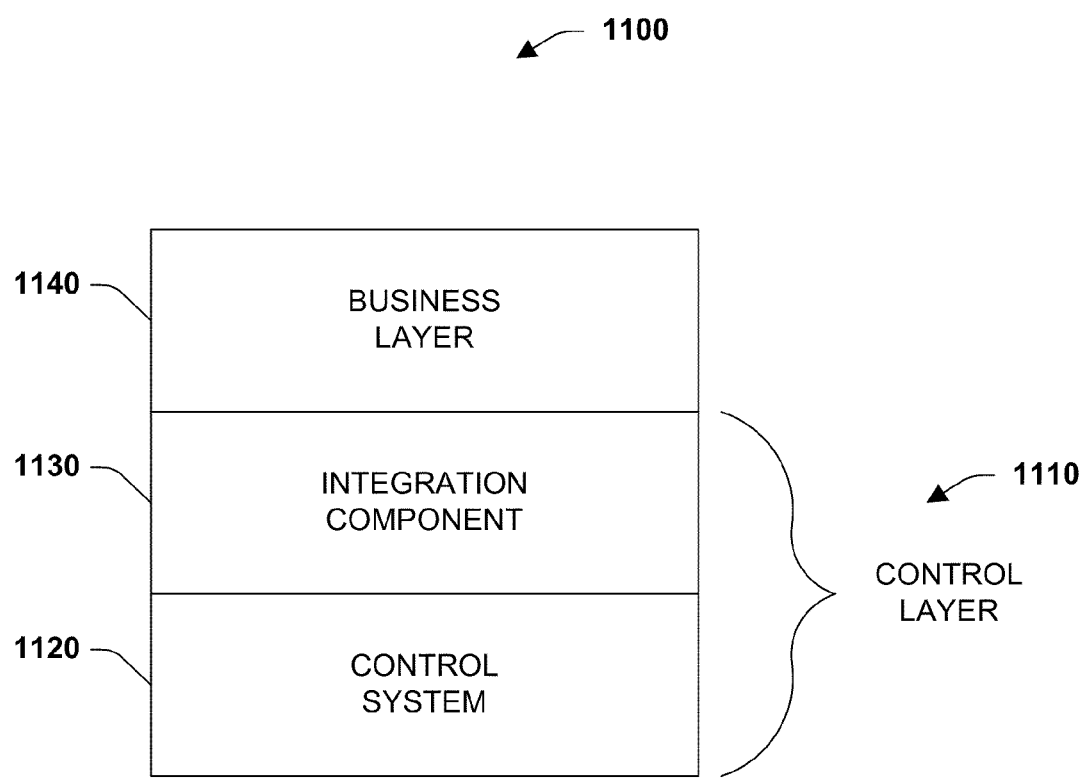
FIG. 11 illustrates an exemplary architecture for integrating control and business layers.

FIG. 11 illustrates an architecture 1100 that integrates control and business layers. The architecture 1100 includes a control layer 1110. As depicted, the control layer 1110 includes a control system 1120 and an integration component 1130. The control system 1120 and/or the integration component 1130 of the control layer can include one or more messaging brokers (not shown) as described herein. As described above, the messaging brokers can provide for reliable messaging within and/or outside of the control layer 1110. The system 1100 further includes a business layer 1140. Likewise, the one or more messaging brokers (not shown) can reside within the business layer 1140, and provide for reliable messaging with the control layer 1110.

It is to be appreciated that the integration component 1130 can be hardware and/or software based. The control system 1120 can have one or more industrial controllers (e.g., programmable logic controllers, or PLC's) for controlling various entities such as plants, machines, industrial automation processes, manufacturing equipment, and the like. Respective controllers can be hardware and/or software based and can execute control programs, routines, instruction sets, and the like that obtain and/or analyze inputs and/or generate outputs that effectuate the controlled entity. It is to be appreciated that such control programs can be programmed in essentially any programming language.

Examples of suitable languages include industrial control languages (e.g., structured text (ST), sequential function chart (SFC), functional block diagram (FBD), instruction list (IL), and ladder diagram (LD)), C, C++, C#, Graphical Motion Language (GML), Java, Flow-Charts, etc., and/or any combination thereof. New instructions in LD, for example, can provide synchronous/atomic data access, and support transactions and reliable messaging instructions. In addition, the controller can add LD instructions, which can perform event based tasks upon the event of message send/receive instead of polling the data source. The control system can also prioritize tasks to throttle the data demands of the business system through the integration component 1130 while still performing the real-time control of the system.

The integration component 1130 can provide an interface that can couple the control system 1120 to the business layer 1140. Such coupling can be through an integration server, a database, a computer, the Internet, etc. as described in detail below. The integration component 1130 can provide for communication between the control system 1120 and entities residing within the business layer 1140 through various communication channels. For example, the integration component 1130 can include a TCP/IP (Transmission Control Protocol/Internet Protocol) based adapter, execution environment such as Java Virtual Machine (JVM), integrated applications, and/or plug-in applications and framework (OSGi).

In one instance, this adapter can provide an Ethernet (e.g., Ethernet, fast Ethernet and Gigabit Ethernet), a web, a markup language (e.g., XML, HTML, XHTML . . . ), a file transfer (e.g., File Transfer Protocol (FTP)), an HTTP (Hyper Text Transfer Protocol), a Universal Plug-n-Play (UPnP), a Java Application Programming (API) (e.g., JMS, JDBC, JTA . . . ), a reliable messaging (e.g., through a broker, or act as a broker), a MQ, a MQTT, JMS topic publish/subscriber and/or point to point queuing, a business object, and/or data binding interface. In addition, the adapter can provide for presenting standard data models like ISO 15745 and S95-ISO 62264, Business Process Execution Language (BPEL), and/or provide a directory (LDAP or Active Directory) of the control system, classification of the equipment and data contained there within, and interact with the security technologies and policies of the IT organization such as firewall against for specific clients based upon ACL or other security and filtering mechanism. In addition, the communication can be hard wire (e.g., CAT5 UTP 8-wire cable, coaxial cable, USB, RS-232. RS-485 . . . ) and/or wireless (e.g., radio frequency (RF), infrared (IR) . . . ). Examples of suitable wireless communication include WiFi IEEE 802.11 and WiMax IEEE 802.16, mesh networks, 802.15.4. Such adapter can provide for communication (e.g., a live data feed) with any entity that employs a similar or complimentary adapter. This capability can be leveraged to provide a mechanism for the control layer 1110, for example, the control system 1120, to directly interact with upper level systems in the business layer 1140 without any middleware between the control and business layers 1110 and 1140.

By way of example, where the integration component 1130 is incorporated within a controller (not shown) of the control system 1120, that controller can talk directly to upper level systems of the business layer 1140 through the integration component 1130. Such communication can include serving up web based data (e.g., web pages, data views, objects, XML . . . ), publishing information (e.g., messages, data, tags, status, state, error messages, integrating with workflow . . . ), or provide web services to an integration server, acting as a message broker and/or provide messages queues and/or topics for pub/sub, database, etc. and/or subscribing to receive information from an integration server, database, etc. It is to be appreciated that the integration component 1130 can synchronize the control system 1120 I/O data updates with the data copies exchanged with the business layer 1140 to perform synchronous data transfers of single and/or multiple data elements, as well as perform transactions, synchronous and/or asynchronous updates, as well as programmable triggering and eventing mechanisms.

Controllers residing on non-TCP/IP networks (e.g., DeviceNet, ControlNet . . . ) can talk to the upper level systems through the controller incorporating the integration component 1130. It is to be appreciated that the integration component 1130 can also be utilized for communication between controllers residing within the control layer 1110. The exchanges of information in both directions, between the business layer 1140 and the control layer 1110 through the integration component 1130, can be based upon programmable triggers and/or events, asynchronous and/or synchronous API interfaces, remote procedure invocations, and/or include message brokers, and/or intelligent queue/de-queuing/filtering of various data priority (e.g., urgent, nominal, low, debugging). Likewise, the business layer 1140 can communicate with controllers residing within the control layer 1110. In addition, the integration component 1130 can provide a mechanism for the business layer 1140 to download, poll, remove, monitor, view, modify, execute, manage, publish/subscribe message and/or topics etc. files, applications, services, etc. in the control layer 1110. Such communication includes tunneling down to any controller residing on any network (e.g., NetLinx, Control & Information Protocol (CIP), Data Highway Plus (DH+) based networks) to view, obtain and/or modify data, files, services and/or applications. The communication also provides for incremental updates to any file, service and/or application residing and/or executing within a controller or device. Such updates can be dynamic and mitigate any need for downloading new firmware to enhance functionality as well as provide revision management.

Conventionally, an additional layer is utilized to couple control layers and business layers. The additional layer typically includes middleware (hardware and/or software) and/or custom application code that transform information between control and business layers since such layers have not included the same data types, binding of data and API interfaces, protocols, applications, messaging paradigms like transactions, reliable messages, asynchronous messaging, brokers, pub/sub topic and queue messaging. The subject architecture mitigates any need for an additional layer between the control layer 1110 and the business layer 1140 through the integration component 1130. It is to be appreciated that the integration component 1140 can be associated with various other features and characteristics useful to the control layer and can facilitate pervasive computing.

Figure 12:
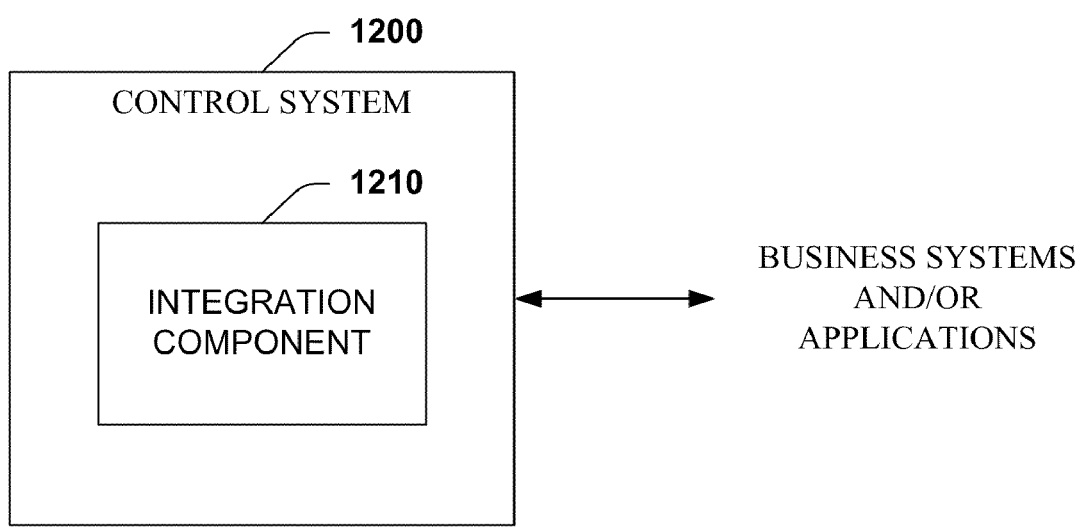
FIG. 12 illustrates an exemplary control system that includes an integration component that provides an interface to one or more business systems and/or applications.

FIG. 12 illustrates an exemplary control system 1200 with an integration component 1210 that provides an interface to one or more business systems and/or applications. The integration component 1210 can reside within (e.g., the chassis) or in connection with an industrial controller (not shown) of the control system 1200 and can facilitate communication between the industrial controller and the business systems and/or applications. For example, the integration component 1210 can provide a TCP/IP based adapter that can be utilized to interface the industrial controller with the business systems and/or applications. It is to be appreciated that the integration component 1210 can provide a data feed with the business systems and/or applications without any middleware. Conventional systems typically employ middleware on intermediate PC boxes (polling and may include handshake information mixed in with the data) since industrial controllers execute instructions programmed in industrial programming languages and business systems do not. By eliminating any need for middleware, the subject invention can mitigate delays, complex integration (e.g., data/control prioritization and security) and cost associated with utilizing middleware.

The control system 1200 can include one or more controllers residing on similar and/disparate networks (not shown). For example, one or more controllers can be associated with an Ethernet/IP, DeviceNet or ControlNet network. Any controller residing on any of these networks can utilize the integration component 1210 to directly communicate with the business systems and/or applications. Where the integration component 1210 resides with a controller, any controller can communicate with the business systems and/or applications through the controller with the integration component 1210. For example, a controller on a DeviceNet network can interact with the controller employing the integration system 1210 to proxy/broker/communicate with the business systems, even though the DeviceNet controller does not speak TCP/IP and/or include all of the applications and/or protocols. The DeviceNet controller can use its native CIP protocol to interact with integration system 1210, which contains various CIP objects whose data attributes and services which interact with the business systems using the native business systems reliable messaging capabilities for example.

It is to be appreciated that such communication can include serving up web pages, data views, objects, XML, web services (ws-notification, ws-eventing, ws-reliable messaging), etc., publishing messages, data, tags, status, state, error messages, etc. to an integration server, database, etc. and/or subscribing to receive information from an integration server by leveraging its data transformation and adapters, database, etc. In one aspect, the controller can be considered a data aggregator, wherein the data is segmented into one or more data views, and the business systems and/or applications request one or more these data views or invoke business objects, for example, based on tags and/or schema of interest. In addition, any business system and/or application can communicate with any controller within the control system 1200 through the integration component 1210. Such communication can includes downloading files, applications and/or services, polling for messages, removing files, applications and/or services, monitoring input, output, state, status, etc. launching and/or terminating applications, configuration and/or control, etc.

Figure 13:
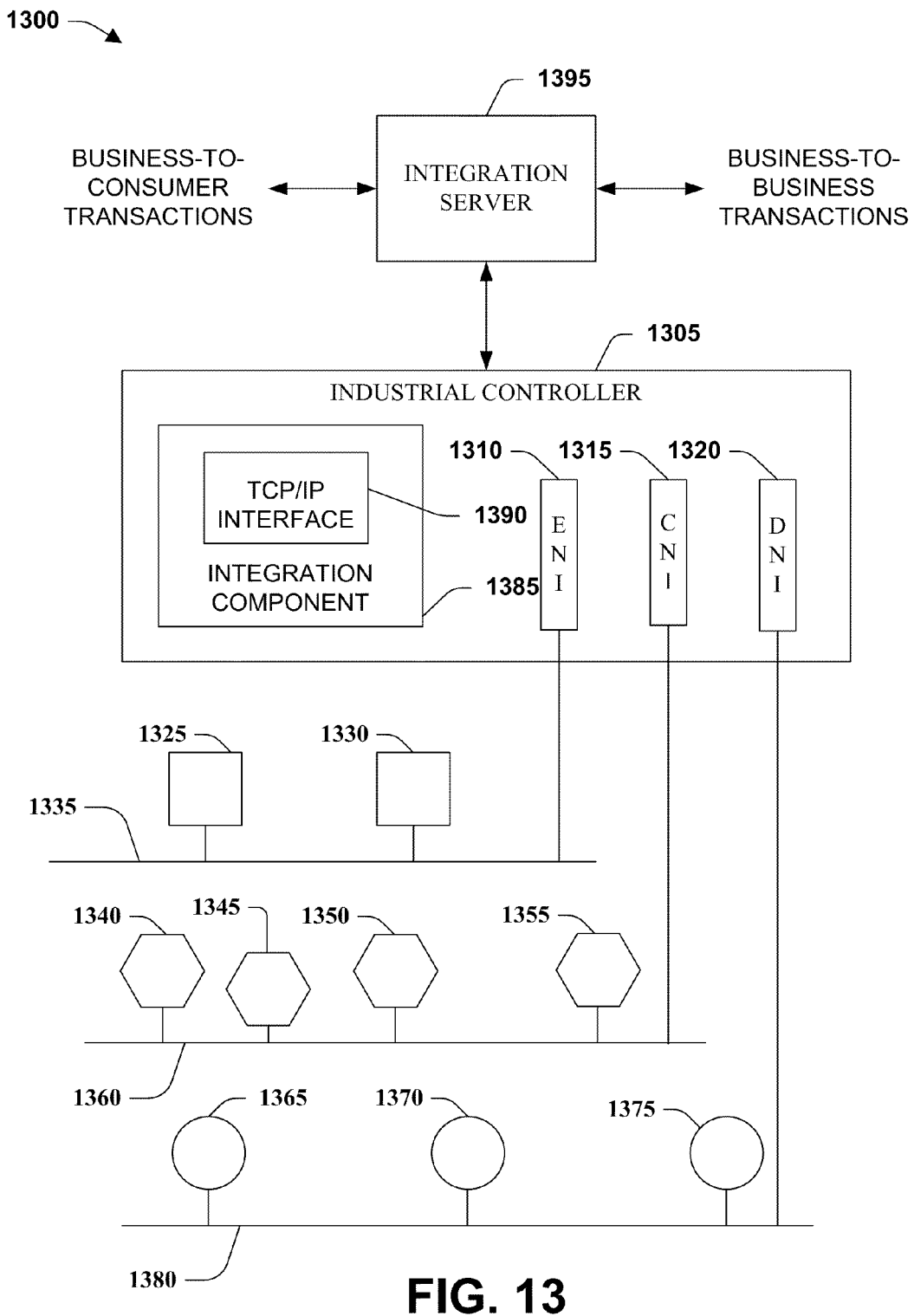
FIG. 13 illustrates an exemplary system that integrates control and business systems using an integration server.

FIG. 13 illustrates a system 1300 that integrates control and business systems through an integration server. The system 1300 includes an industrial controller 1305 with an Ethernet/IP interface 1310, a ControlNet interface 1315 and a DeviceNet interface 1320. The Ethernet/IP interface provides for communication with a device 1325 and a device 1330 residing on an Ethernet/IP network 1335. The ControlNet interface 1315 provides for communication with non-TCP/IP based devices 1340, 1345, 1350 and 1355 (collectively referred to hereafter as devices 1340-1355) residing on a ControlNet network 1360. The DeviceNet interface 1320 provides for communication with non-TCP/IP based devices 1365, 1370 and 1375 (collectively referred to hereafter as devices 1365-1375) residing on a DeviceNet network 1380. The devices 1325, 1330, 1340-1355 and 1365-1375 can be utilized to control various industrial processes, machines, manufacturing equipment, plants, and the like and can include input, output, memory and processing modules to facilitate control. Respective controllers can execute control programs, routines, instruction sets, and the like, which obtain and/or analyze inputs and/or generate outputs that effectuate the controlled entity (e.g., a motor, a drive, a valve, a solenoid, a switch . . . ). Such control programs can be programmed in essentially any programming language including industrial control languages (e.g., ST, SFC, FBD, IL and LD), C, C++, C#, GML, Java, Flow-Charts, etc., and/or any combination thereof, and/or include new instructions for the purpose synchronous data movement and/or performing transactions and/or event based tasks. These event based tasks can be configured to block and wait on the reception of a new message, or a message delivery.

The industrial controller 1305 further includes an integration component 1385 with a TCP/IP adapter 1390, which can provide a TCP/IP gateway between the devices 1325, 1330, 1340-1355 and 1365-1375 and an integration server 1395. The integration sever 1395 can be a computer, server, cluster, or service oriented architecture (SOA) designed and utilized to couple and facilitate interaction between business and/or consumer trading partners. By way of example, two businesses that employ disparate operating systems and/or applications can utilize the integration server 1395 to interact across internal and external networked computer systems. Likewise, a consumer and a business can utilize an integration server 1395 for interaction between different systems. Commerce between business partners generally is referred to as business-to-business (B2B) commerce and typically includes transactions between two businesses exchanging funds, goods, services and/or data. Commerce between a business and a consumer generally is referred to as business-to-consumer (B2C) commerce and commonly encompasses transactions such as the exchange of services, information and/or products. The integration server 1395 can act as a data switch with adapters for the various platforms and/or application interfaces. Suitable integration servers include WebMethods Integration Server, IBM WebSphere, IBM DB2 Information Integrator (DB2II), Tibco ActiveEnterprise, BEA WebLogic, Oracle9iAS InterConnect and Oracle Workflow 2.6.2, PeopleSoft Integration Broker, and SAP NetWeaver, for example.

It is to be appreciated that the integration server 1395 can be designed to support various prepackaged, customized, and/or legacy applications. Such applications can be designed based on standards such as XML, HTTP, JMS, SOAP, LDAP, and the like. In addition, both hub-and-spoke based integration servers and network-centric based integration servers can be employed in accordance with aspects of the subject invention. In general, with hub-and-spoke based integration servers, applications connect through a central server, which manages communication, data translation, and process interactions among the connected systems and applications. With network-centric bus based integration servers, nodes are linked along a common backbone, and communication between interconnected systems and applications travel along the backbone to the integration server that handles the data transformation, translation, and routing to the receiving nodes.

As noted above, the integration component 1385 and the TCP/IP adapter 1390 can provide a TCP/IP gateway between the devices 1325, 1330, 1340-1355 and 1365-1375 and an integration server 1395. This gateway can be utilized as an Ethernet, a web, a file transfer, an HTTP, an HTTPS, an operating system and/or execution environment such as a Java virtual machine (JVM) and API. In addition, the gateway can provide for data transports and API such as JMS, JDBC, JTA, etc. Furthermore, the gateway can provide firewall and/or security capabilities such as SASL (e.g., Kerberos . . . ) and SSL between the controller 1305 and the integration server 1395, LDAP directory services and/or a reliable messaging interface. It should be appreciated that the component 1390, commonly referred to as the TCP/IP adapter, can represent communications components, which includes TCP/IP, UDP/IP, Multicast Ethernet protocols, including IPv4 and IPv6. Any of the devices 1325, 1330, 1340-1355 and 1365-1375 can utilize the integration component 1385 and the TCP/IP adapter 1390 to communicate with the integration server 1395, and the integration server 1395 can utilize the integration component 1385 and the TCP/IP adapter 1390 to communicate with the devices 1325, 1330, 1340-1355 and 1365-1375. This capability can be leveraged to mitigate any need for middleware and extra PC boxes and polling protocols, for example, as employed by conventional systems to facilitate such interaction. Communication between the devices 1325, 1330, 1340-1355 and 1365-1375 and the integration server 1395 can include, but is not limited to, serving up web based data (e.g., web pages, data views, XML, a web object, a CIP object . . . ), publishing information (e.g., messages, data, tags, status, state, error messages . . . ), subscribing to receive information, and/or polling for information. In addition, the communication can include downloading, launching, terminating, updating, pausing, monitoring and/or removing applications. Furthermore, suitable communication includes tunneling down to any of the 1325, 1330, 1340-1355 and 1365-1375 devices.

Figure 14:
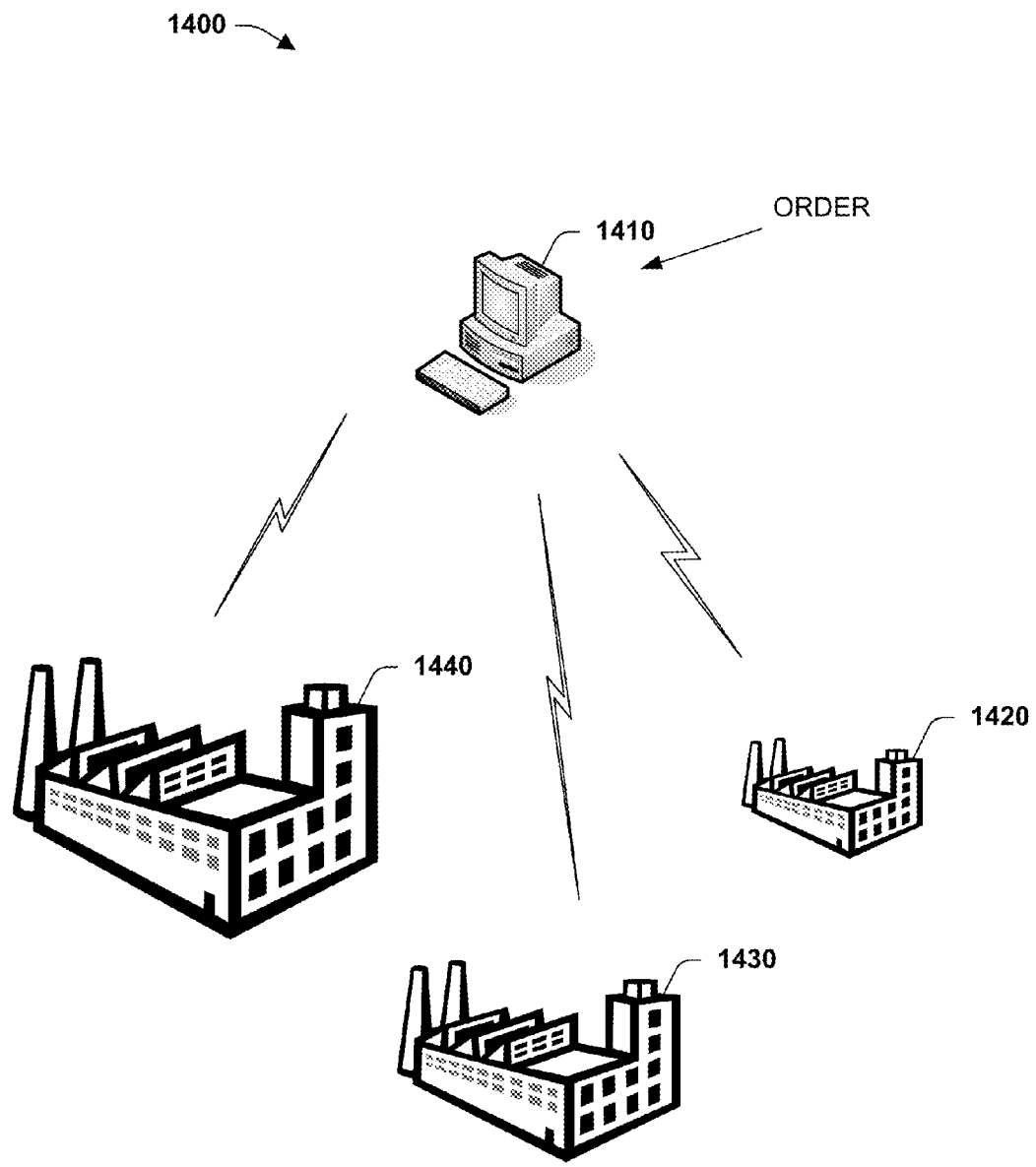
FIG. 14 illustrates an exemplary application employing the integration component within a manufacturing environment.

FIG. 14 provides a particular application wherein the subject invention can be employed. It is to be understood that this example is for explanatory purposes and does not limit the subject invention. FIG. 14 depicts a system 1400 that integrates control and business systems. The system 1400 includes a cluster, server, service or microprocessor based device 1410 running a business application(s) and possibly database(s) and integration server(s), implementing Business Process Execution Language (BPEL/BPEL4WS) and workflow, etc. It is to be appreciated that the device 1410 can be part of an Enterprise Resource Planning (ERP), a Manufacturing Execution System (MES) or a Machine Control (MC) system. The device 1410 can be utilized to accept orders from customers or trading partners. Such orders can be placed over the Internet, through email, through a web page, through a trading grid, etc. In addition, the device 1410 can interact with an integration server, and such orders can be obtained through the integration server. As depicted, a received order can be processed by a plant 1420, a plant 1430 and/or a plant 1440. It is to be appreciated that more or less plants can be utilized to process the order. The plants utilized in this example are illustrative and not limitative.

The plants 1420-1440 can be associated with different manufacturing capacities, location, labor, quality, associated costs, performance, software configuration and revisions, machine utilization and maintenance schedules. For example, the plant 1440 may be able to manufacture two, three, etc. times the quantity of the plant 1420 within a similar amount of time. In another example, a plant may be concurrently processing different orders, wherein each order consumes a portion of the total manufacturing capacity and, thus, determines an available capacity. After receiving the order, the device 1410 can execute business logic to determine current manufacturing capacity of the plants 1420-1440. The business logic can be routed to the integration server, which can suitably map, if needed, the logic instructions for the plants 1420-1440 and convey the instruction thereto. Such conveyance can be achieved through a publish/subscribe mechanism.

Respective plants 1420-1440 can include one or more controllers with an integration component, as described herein. The integration component can provide a TCP/IP based interface, and optionally security, between the integration server and the plants 1420-1440, and the order can be passed down through this TCP/IP connection. Respective plants 1420-1440 can provide capacity related information through the integration component to the integration server (e.g., via publishing), wherein the device 1410 can obtain the capacity related information (e.g., through polling and/or subscription mechanism). It is to be appreciated that the capacity related information can also be provided from the plants 1420-1440 as web pages, XML, HTML, business objects, data views, reliable messages, files, web services, etc. In addition, the capacity related information can be provided through email and/or a chat room.

In one instance, the capacity related information can be utilized to determine which of the plants 1420-1440 should process the order, including distributing the order across plants 1420-1440. In addition, the plants 1420-1440 can communicate with various other entities (e.g., suppliers, wholesalers, retailers . . . ) through the integration component to obtain at least a portion of the capacity related information. For example, one of the plants 1420-1440 may have available time to process the order, but may not have sufficient resources (e.g., materials) to complete the order. In this instance, that plant can communicate through its integration component to the integration server to request resources. The result may indicate that sufficient resources can be obtained within a specified time frame. This time frame can be included in the capacity information provided to the device 1410, wherein the user can determine whether the time frame is acceptable.

Upon selecting one or more of the plants 1420-1440 to process the order, the capacity related information can be updated and refreshed through a subsequent communication. In addition, the plant(s) processing the order can provide periodic status (e.g., began processing, X % completed, where X is a real number, finished processing . . . ) updates for the customer. Such updates can be provided through an associated integration component to the integration server. For example, the controller can utilize its integration component to publish status updates. The customer can receive such publications by subscribing to receive them. It is to be appreciated that published information can be obtained in a plant through RFID tags. For example, the information stored within a RFID tag can be indicative of the status. For example, when the order has been processed, a corresponding RFID tag can be written with electronic data that indicates the order has been completed. The controller and its integration component may include RFID middleware and interact directly with RFID readers or RFID middleware on remote servers.

The controller and integration component may coordinate material movement, workflow and tracking by leveraging the RFID tags using local applications or services via the network connection. Another aspect is the controller and its integration component may exchange data (e.g. reliable messages, queue/topic, JMS or MQTT, TCP/UDP socket) with RFID printer/label/programming devices directly with or without the services of an integration server. When the RFID tag is read, this status information can be obtained and conveyed to the customer through the controller's integration component and the integration server or other RFID gateway and edge server middleware. For example, the customer can be notified through email or a web tracking interface when the order has been processed. In another example, newly manufactured goods can have new RFID tags and/or associated information that needs to get published to a global registry such as UCCnet Global Registry and/or made available via other means to trading partners. These RFID related messages can flow from reliable message queues/topics located in the controller and/or integration component in an automation layer and/or RFID middleware to business applications and/or global registry through integration server adapters such as web services, reliable messages, file transfers, and/or email that can include binary/text attachments, or directly when possible without the services of the integration server.

In general, an RFID tag is a semiconductor chip with one or more antennas affixed to a product. The chip is utilized to store electronic data related to the product. Reading from and/or writing to an RFID tag can be achieved through radio frequency (RF) based wireless communication via devices referred to as an RFID reader. In general, writing is utilized to add and/or modify product specific information to an RFID tag, and reading is utilized to retrieve the information, for example, to provide for automatic product identification. In many instances, the electronic data written to and/or read from an RFID tag includes an Electronic Product Code (EPC), which, in general, is a unique number that is encoded (e.g., as a bit code) and embedded within the RFID tag. Typical EPC data can include information about the product (e.g., product type, date of manufacture, lot number, etc.) and/or associated cases, pallets, and/or container levels, for example.

Typically, an RFID tag periodically emits (e.g., hundreds of times per second) product information. When passed through or scanned by a reader, the emitted date can be retrieved. This technique enables product information to be obtained without unpacking the product or scanning barcode labels. In one instance, products and corresponding RFID tags can be associated with an agent-based manufacturing control system. In general, an agent-based control system is a community of autonomous, intelligent computational units referred to as agents. Respective agents typically are responsible for local decision making and control of one or more explicit parts of a manufacturing process, wherein cooperation amongst the agents render a desirable global behavior of controlled systems and/or processes. Cooperation between the agents typically is based on communication via transmitting messages following various interaction and negotiation scenarios and/or protocols.

In another aspect of the subject invention, the inventory related information can be obtained and utilized to affect the manufacturing at any of the plants 1420-1440. For example, the inventory related information may be utilized to determine whether manufacturing needs to ramp up based on demand or whether an inventory exists and manufacturing should continue, slow down, or even temporarily halt. In one instance, manufacturing can be halted in order to mitigate costs associated with maintaining the inventory. In another instance, the inventory information can be conveyed through an integration component of the plants 1420-1440 to a trading grid. Traders participating therein can bid and/or negotiate for inventoried items. The activity within the trading grid can be utilized to facilitate determining whether to increase, continue, slow down, or halt manufacturing. In yet another aspect, if on of the plants 1420-1440 is offline, if a controller within the plant determines inventory exists, then the inventory can be traded immediately rather that wait the plant to brought back up or for personnel to manually enter such information into the system.

In yet another example, a manufacturing process at any of the plants 1420-1440 can require relatively large amounts of electricity to perform processes. The plants 1420-1440 can integrate its control system with a power utility system. In doing so, both parties can benefit with the power utility having more accurate and control over power demand planning, and the manufacturer can realize more cost effective manufacturing due to lower energy costs. When the control system responsible for actual execution of the manufacturing is more tightly coupled with the internal business inventory systems, tracking goods used and produced during manufacture, and integrated with the real time customer demand, pricing, cost of goods, and expected delivery, a more efficient and competitive business can emerge. By integrating interfaces, applications, protocols, connectors, and/or adapters supported by integration servers, the control system can seamlessly be integrated into the business applications, such as CRM, ERP, and MES, for example.

Figure 15:
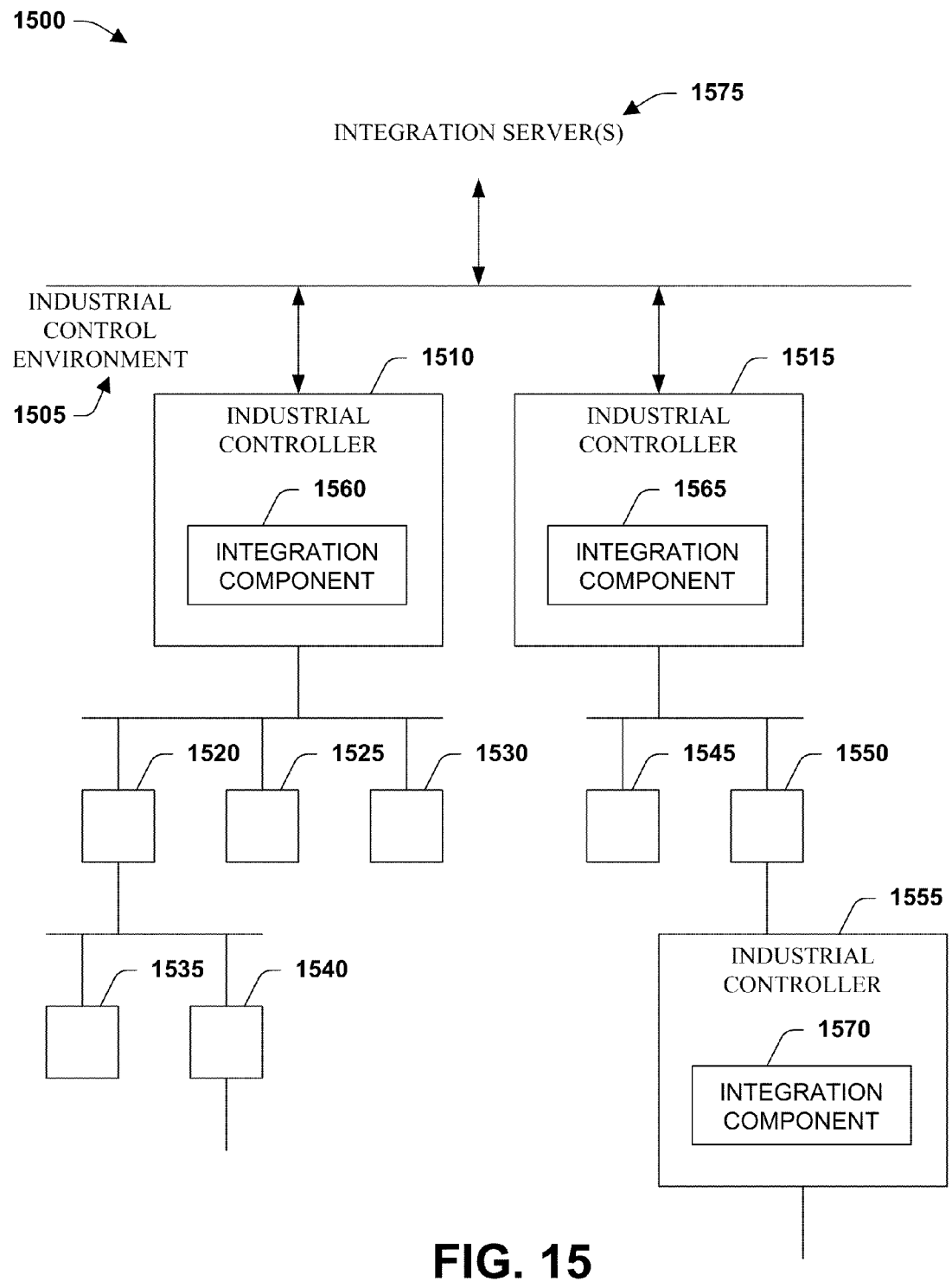
FIG. 15 illustrates an exemplary system that employs a plurality of integration components to integrate control and business systems.

FIG. 15 illustrates a system 1500 that employs a plurality of integration components to integrate control and business systems. The system 1500 includes an industrial control environment 1505 with a plurality of controllers 1510, 1515, 1520, 1525, 1530, 1535, 1540, 1550 and 1555. The controllers 1510, 1515 and 1555 respectively include integration components 1560, 1565 and 1570. As depicted, controllers 1510 and 1520-540 utilize the integration component 1560 to communicate with an integration server(s) 1575, and the controllers 1515 and 1545-555 utilize the integration component 1565 to communicate with the integration server(s) 1575. It is to be appreciated that in various aspects of the subject invention, more than one integration component can be jointly utilized to facilitate such communication.

As described above, the industrial controllers 1510, 1515, 1520, 1525, 1530, 1535, 1540, 1550 and 1555 can be associated with various industrial automation networks, including TCP/IP and non-TCP/IP networks and can utilize associated integration components to communicate with the integration server(s) 1575 over a TCP/IP communication channel (including TCP, UDP, unicast/multicast, IPv4, IPv6, and including security such as IPSec, SSL . . . ). Examples of communication at least include publishing, subscribing to receive, polling, viewing, etc. data (e.g., associated with an integration server and database), downloading, invoking, updating, removing, terminating, etc. executable applications, and reliable messaging. In addition, suitable communication includes serving web pages and web objects, web services and conveying email.

Figure 16:
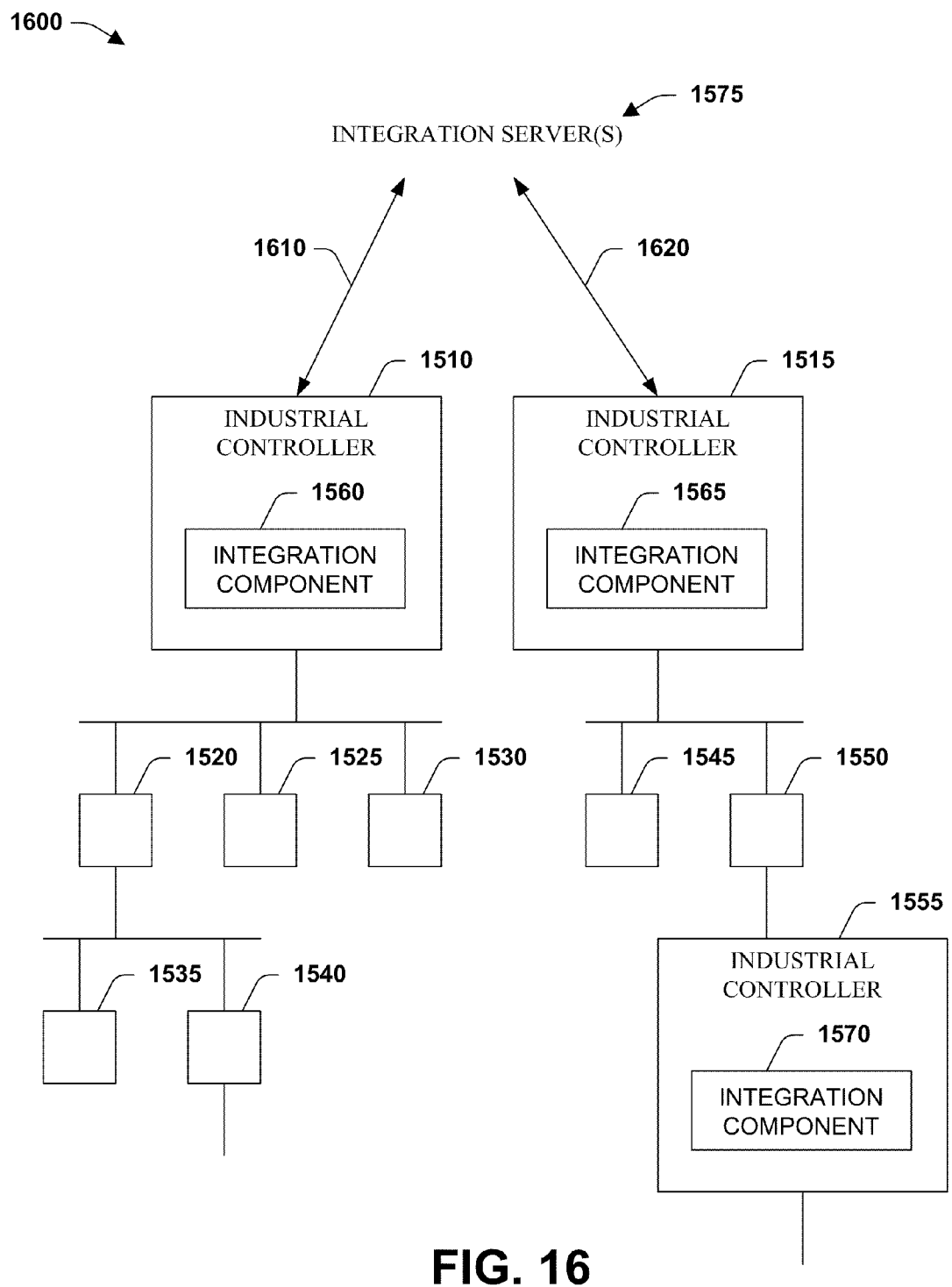
FIG. 16 illustrates an exemplary system that employs integration components to integrate multiple control systems and business systems.

FIG. 16 depicts the system 1600, wherein the controllers 1510 and 1515 and their respective networks reside within disparate industrial control environments, but can utilize similar integration servers to communicate with businesses and/or consumers. For example, controllers associated with the integration component 1560 can communicate with the integration server(s) 1575 through a channel 1610, and the controllers associated with the integration component 1565 can communicate with the integration server(s) 1575 through a channel 1620. In addition, the controllers 1510 and 1515 can utilize respective integration components 1610 and 1620 to communicate with each other through the integration server(s) 1575.

Figure 17:
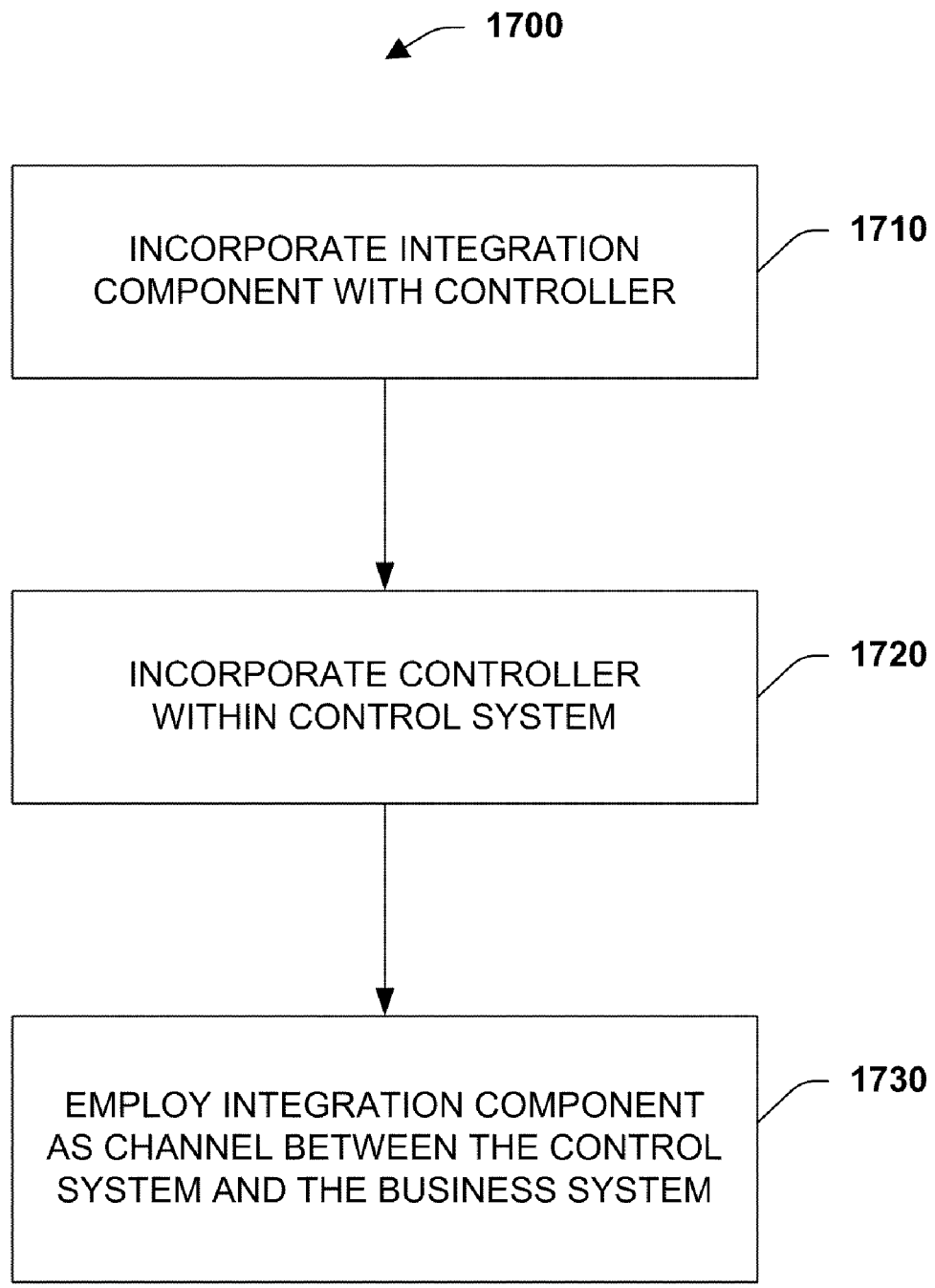
FIG. 17 illustrates an exemplary method for integrating control and business systems.
Figure 18:
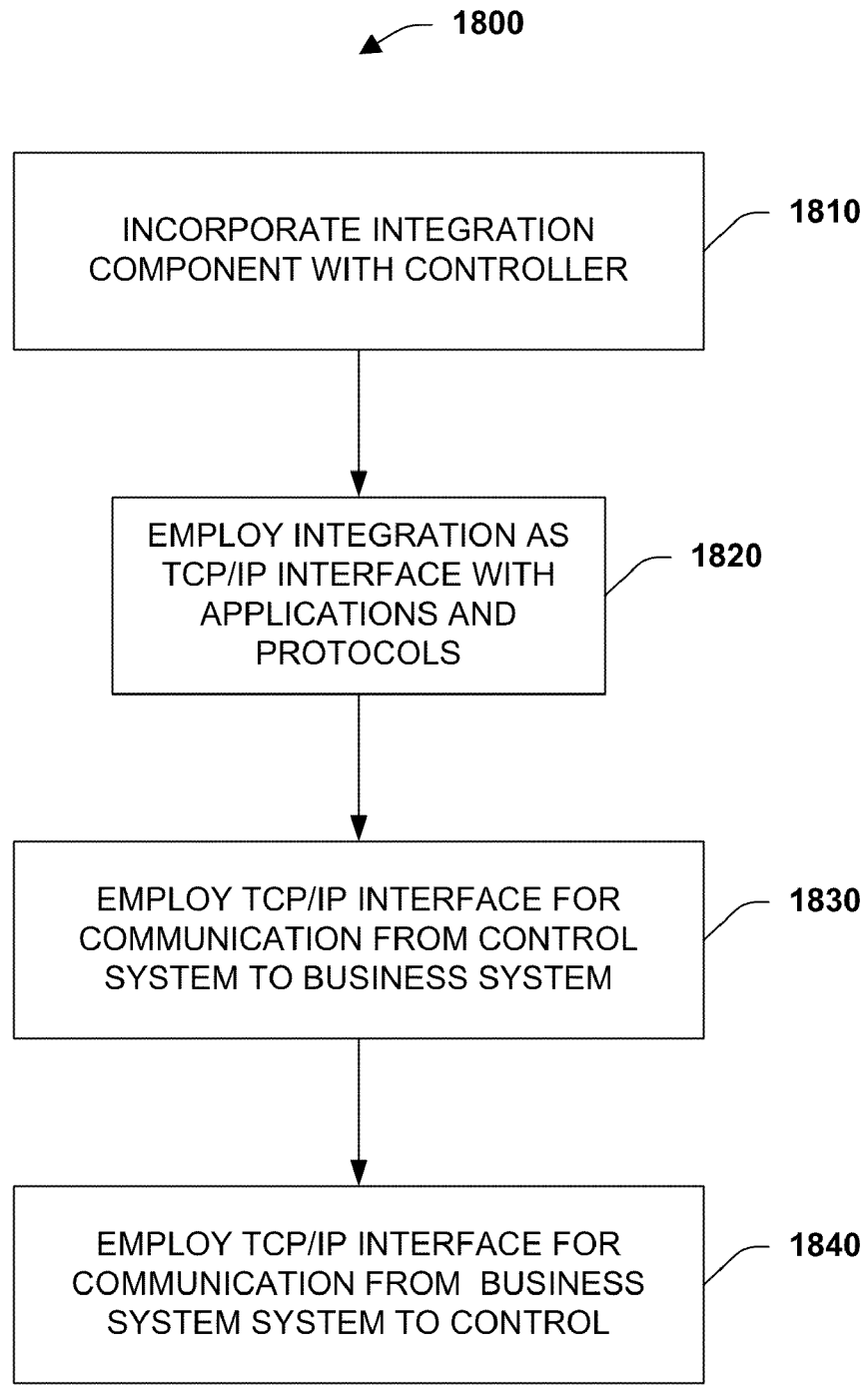
FIG. 18 illustrates another exemplary method for integrating control and business systems.

FIGS. 17-18 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 17 illustrates a method for integrating control and business systems. At 1710, an integration component as described herein is incorporated into an industrial controller. The controller can be a programmable logic controller (PLC) or the like. As such, the controller can execute control programs, routines, instruction sets, etc. that obtains and/or analyze inputs and/or generate outputs that effectuate a controlled entity. Such control programs can be programmed in essentially any programming language. Examples of suitable languages include industrial control languages such as ST, SFC, FBD, IL and LD, C, C++, C#, GML, Java, Flow-Charts, etc., and/or any combination thereof. Moreover, such languages can include new instructions, which can perform data updates synchronized with the control system data handlers, provide atomic data updates, data table lock/read/write/modify/unlock, data table revisions and/or transactions in/out of the control layer At reference numeral 1720, the controller can be incorporated into a control system that controls or monitors various entities such as plants, machines, industrial automation processes, manufacturing equipment, and the like. Such incorporation includes interfacing other controllers in the control system with the controller with the integration component. At reference numeral 1730, the controller with the integration component can then be utilized to provide an interface with a business system, integration server and/or database. For example, the integration component can be utilized as a TCP/IP adapter and/or Java Virtual Machine (JVM) and/or associated applications, APIs and protocols. Such adapter can provide an Ethernet, web, XML, HTML, XHTML, file transfer, HTTP, JDBC, email, and/or a reliable messaging interface like JMS, MSMQ, MQ, and MQTT, web services (ws-reliable messaging, ws-eventing, ws-notification). In addition, the adapter can provide for transactions such as Java Transaction API (JTA) based transactions and support Business Process Execution Language (BPEL), BPEL4WS (BPEL For Web Services), and BPELJ (BPELJ with Java business logic) for workflow. Communication through this interface can be via wire and/or wireless techniques and include any of the following TCP, UDP, unicast or multicast, IPv4, IPv6, and/or IPSec packets. The foregoing can provide a mechanism to directly interact with the business systems, databases, and/or integration servers without any middleware.

FIG. 18 illustrates a method for integrating control and business systems. At 1810, an industrial controller with an integration component is incorporated into a control system. Such system can be utilized to include disparate industrial control networks (e.g., Ethernet/IP, ControlNet and DeviceNet) and control various entities such as plants, machines, industrial automation processes, manufacturing equipment, and the like. At 1820, the integration component is utilized to provide a TCP/IP interface and applications for Ethernet, web, XML, HTML, XHTML, file transfer, HTTP, Java, email, a reliable message communications, and/or workflow between any of the controllers within the control system and a business system, a database and/or an integration server.

At reference numeral 1830, at least one controller communicates with the business system, database and/or integration server through the integration server. Such communication can include serving up web pages, data views, XML, etc., publishing information such as messages, data, tags, status, state, error messages, etc., and/or subscribing to receive information from the business system, database and/or integration server. Controllers residing on non-TCP/IP networks can talk to the upper level systems through the integration component. In addition, the integration component can also be utilized for communication between controllers within different control systems.

Alternatively, at 1840 the business system, database and/or integration component can communicate with any of the controllers within the control system through the integration component. For example, at least one of these upper level systems can employ the integration component to download, poll, remove, request, monitor, view, modify, execute, manage, etc. files, applications, services, etc. from the control system. Such communication can include tunneling down through controllers and/or networks to communicate with nested controllers and/or networks, including non-TCP/IP based controllers and/or network (e.g., NetLinx, Control & Information Protocol (CIP), Data Highway Plus (DH+) based networks) to view, obtain and/or modify data, files, services and/or applications. The communication also provides for incremental updates to any file, service and/or application residing and/or executing within a controller. Such updates can be dynamic and mitigate any need for downloading new firmware.

Figure 19:
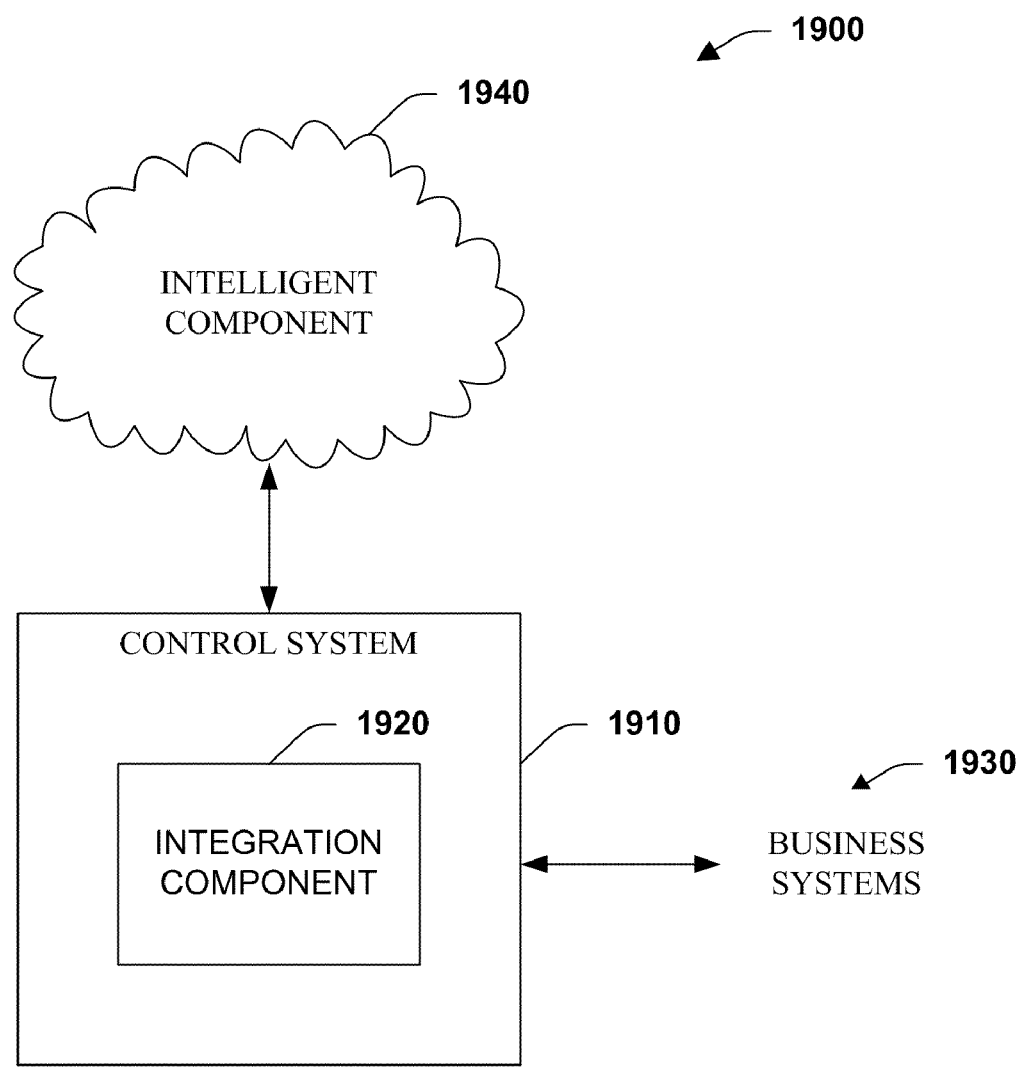
FIG. 19 illustrates an exemplary a system that employs intelligence to facilitate integration of control and business systems.

FIG. 19 illustrates a system 1900 that employs intelligence to facilitate integration of control and business systems. The system 1900 includes a control system 1910 with an integration component 1920. As described in detail above, the integration component 1920 can provide a TCP/IP interface with one or more business systems 1930, for example, through an integration server (not shown). The system 1900 further includes an intelligent component 1940 that can be utilized to facilitate the integration component 1920 with any decision making and data filtering. It is to be appreciated that the intelligent component 1940 can utilize applications, configured triggers, and/or statistics, heuristics, probabilities, historical data, costs, etc. in connection with facilitating the integration component 1920 by performing a probabilistic and/or statistic-based analysis, which can be utilized to infer and/or render decisions.

The intelligent component 1940 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 20:
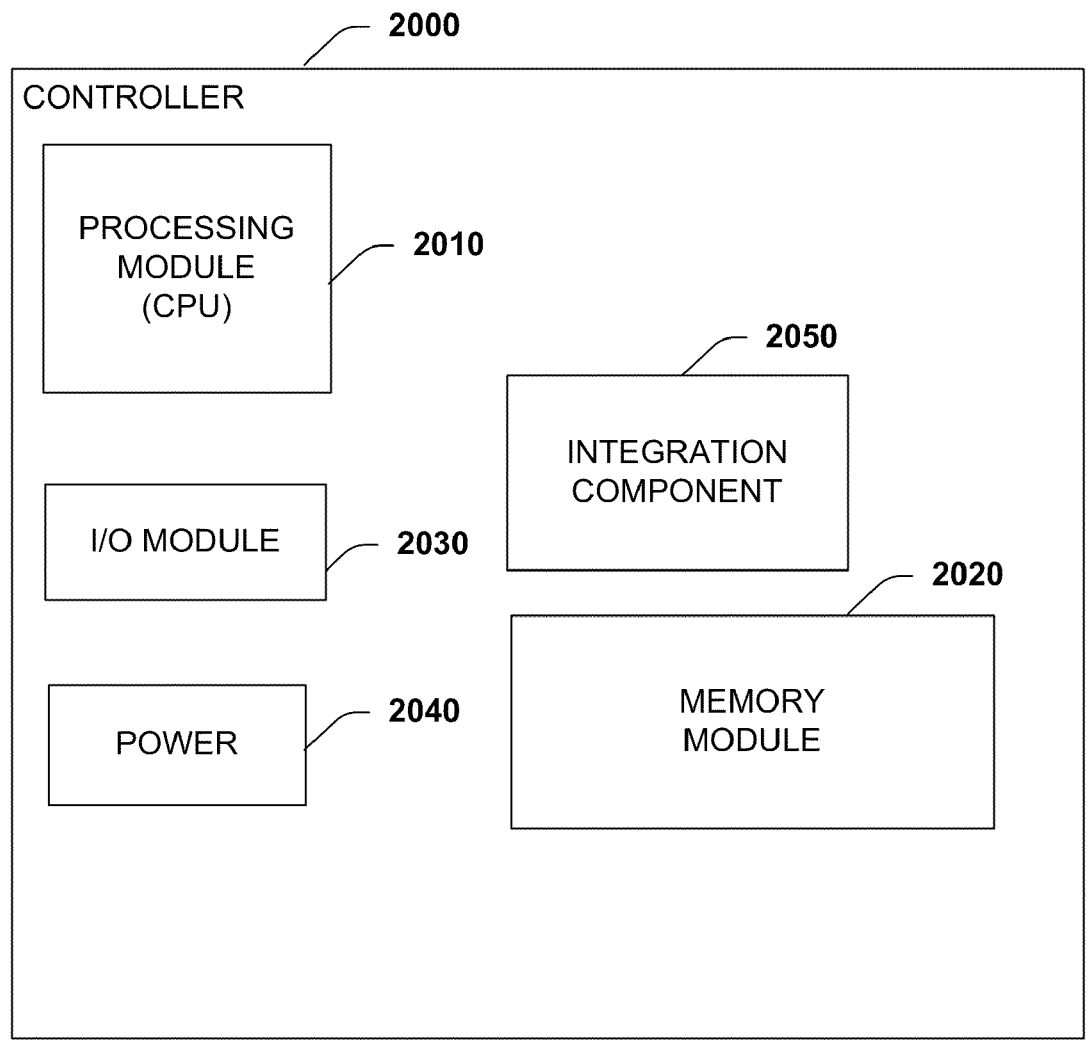
FIG. 20 illustrates an exemplary industrial controller in accordance with an aspect of the invention.

FIG. 20 illustrates an exemplary industrial controller 2000 in accordance with an aspect of the invention. The industrial device 2000 can be a programmable logic controller (PLC), and the like. A typical industrial controller is a special purpose processing device for controlling (e.g., automated and semi-automated) industrial processes, machines, manufacturing equipment, plants, and the like. The industrial controller 2000 can include one or more modules such as a processing module 2010, a memory module 2020, and an I/O module 2030. In addition, the industrial controller 2000 can include a power component 2040 that energizes the components 2010-1030. In addition, these components may be virtualized by applications, processes, and threads running on a computer.

The processing module 2010 can be utilized to execute control applications, end-user programs and associated instructions, which can be stored within the memory module 2020 or memory external to the industrial controller 2000. It should be appreciated that the memory module 2020 can refer to both volatile and non volatile storage including RAM, FLASH, disk, Storage Area Network (SAN), Network Attached Storage (NAS), iSCSI interface etc. Such control programs can be utilized to measure one or more process variables or inputs representative of the status of a controlled process and/or effectuate outputs associated with control of the process through the I/O module 2030 (which may be local and/or networked). The inputs and outputs can be digital and/or analog, assuming a continuous range of values. For example, an input channel of the I/O memory 2030 can be employed to receive analog and digital signals through sensors, switches and the like to provide information indicative of state and/or relating to a process, whereas an output channel can be utilized to convey a next state to an entity under the control of the controller. An output of the I/O module 2030 can interface directly with a controlled process by providing an output from memory to an actuator such as a motor, drive, valve, solenoid, and the like, RFID (tag, reader, printer . . . ), etc. Both inputs and outputs can be recorded in the I/O memory 2020.

A typical control routine can be created in a controller configuration environment that has various tools and interfaces whereby a developer can construct and implement a control strategy using industrial and conventional programming languages or graphical representations of control functionality. Such control routine can be downloaded from the configuration system into the controller memory module 1020 for implementation of the control strategy in controlling a process or machine. The controller 1000 further includes an integration component 1050, which can provide a network interface (e.g., TCP/IP, UDP/IP, IPv4, IPv6 . . . ) interface, execution environment like a JVM (Java Virtual Machine), and/or operating system, data along with integrated and plug in applications and/or protocols that interface with business systems, integration servers, web servers, and/or databases associated therewith, as described in detail herein.

Figure 21:
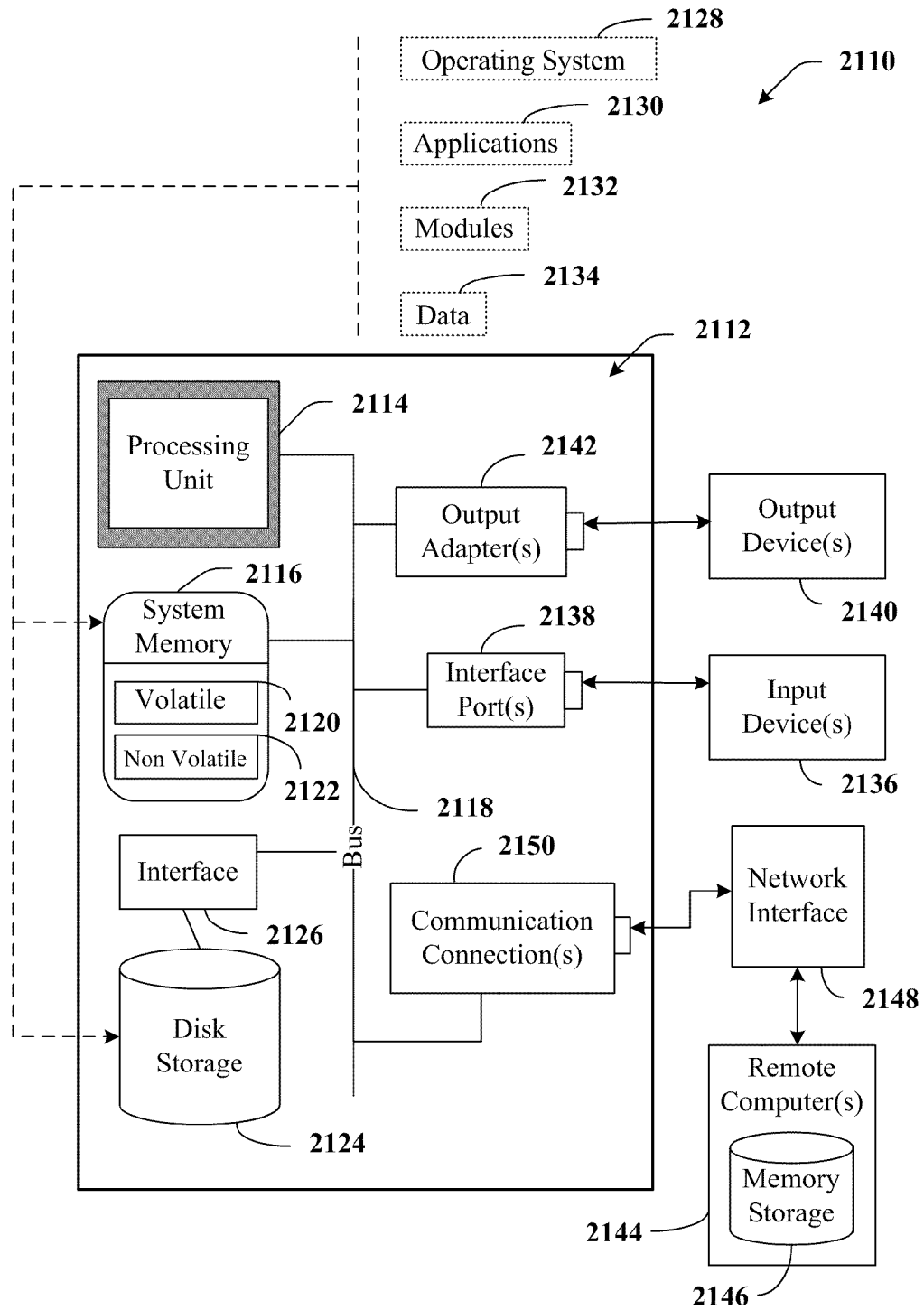
FIG. 21 illustrates an exemplary computing architecture that can be employed in connection with the subject invention.
Figure 22:
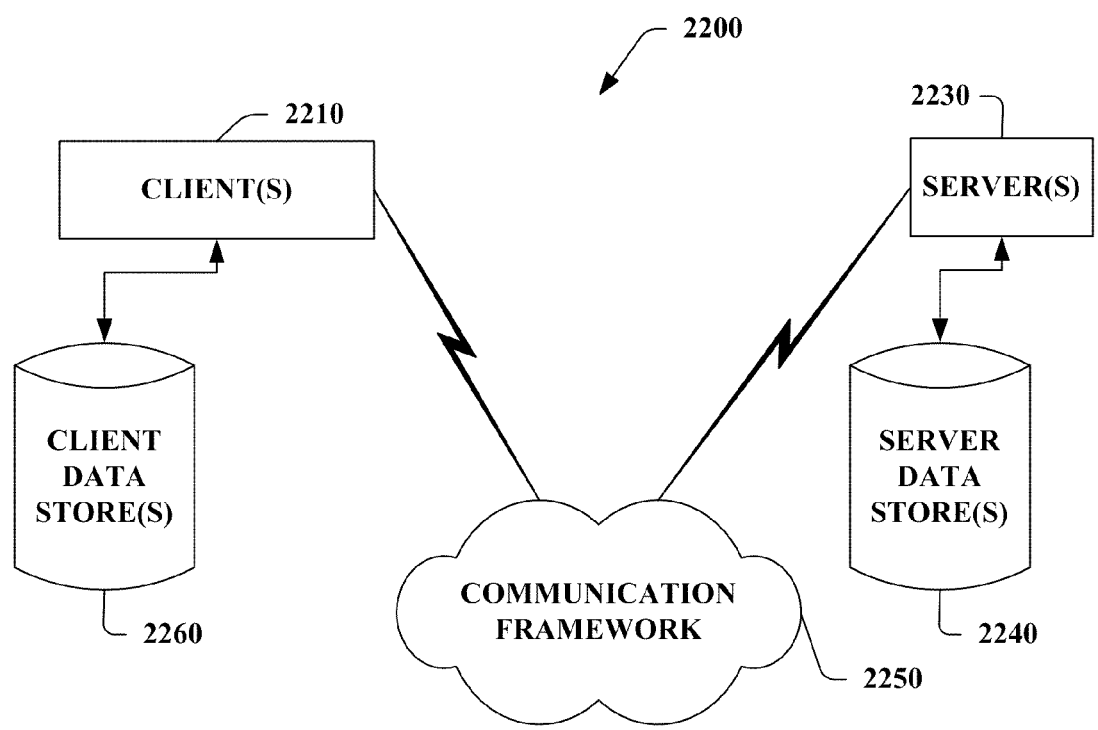
FIG. 22 illustrates an exemplary networking environment that can be employed in connection with the subject invention.

In order to provide a context for the various aspects of the invention, FIGS. 21 and 22 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 21, an exemplary environment 2110 for implementing various aspects of the invention includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multi-processor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable programmable ROM (EEPROM), or flash memory. Volatile memory 2120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer system 2112. System applications 2130 take advantage of the management of resources by operating system 2128 through program modules 2132 and program data 2134 stored either in system memory 2116 or on disk storage 2124. It is to be appreciated that the present invention can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112 and to output information from computer 2112 to an output device 2140. Output adapter 2142 is provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN), and mesh networks. LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL). Mesh networks include, but are not limited to networks like ZigBee, IEEE 802.15.4.

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

FIG. 22 is a schematic block diagram of a sample-computing environment 2200 with which the present invention can interact. The system 2200 includes one or more client(s) 2210. The client(s) 2210 can be hardware and/or software (e.g., threads, processes, computing devices). The system 2200 also includes one or more server(s) 2230. The server(s) 2230 can also be hardware and/or software (e.g., threads, processes, computing devices). The servers 2230 can house threads to perform transformations by employing the present invention, for example. One possible communication between a client 2210 and a server 2230 can be in the form of a data packet adapted to be transmitted between two or more computer processes. The system 2200 includes a communication framework 2250 that can be employed to facilitate communications between the client(s) 2210 and the server(s) 2230. The client(s) 2210 are operably connected to one or more client data store(s) 2260 that can be employed to store information local to the client(s) 2210. Similarly, the server(s) 2230 are operably connected to one or more server data store(s) 2240 that can be employed to store information local to the servers 2230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An industrial controller that facilitates decoupled transmission of messages between a sender and a recipient in an industrial automation environment, comprising:
   a processor;
   a memory device communicatively coupled to the processor, the memory device having stored therein computer-executable components configured to implement the industrial controller, including a first broker, residing on the industrial controller, that receives and stores a message generated by the industrial controller in a message data queue, and delivers the message to at least one entity subscribed to receive the message in accordance with at least one notification policy specified by the at least one entity, wherein the first broker receives a schema from the industrial controller defining a format for the message and publishes the schema to a message revision queue.

2. The industrial controller of claim 1, wherein the first broker receives and stores the message independent of a state of the at least one entity.

3. The industrial controller of claim 1, wherein the at least one notification policy includes at least an instruction to send messages relating to a data change within an industrial process to the entity in response to a determination that the data change is greater than a threshold value.

4. The industrial controller of claim 1, wherein the at least one notification policy includes at least a specified minimum time delay between message transmissions to the at least one entity.

5. The industrial controller of claim 1, wherein the at least one notification policy includes at least an instruction that the broker is to delete unhandled messages after a specified elapsed time.

6. The industrial controller of claim 1, wherein the first broker is transmits a notification to the at least one entity in response to receipt of a new message from the industrial controller, wherein the notification includes an indication that that the new message is available for retrieval.

7. The industrial controller of claim 1, wherein the first broker delivers the schema to the at least one entity.

8. The industrial controller of claim 1, wherein the first broker exchanges messages with a second broker associated with the at least one entity, wherein notification policies are individually configurable for the first broker and the second broker.

9. The industrial controller of claim 1, wherein the first broker segregates messages received from the at least one industrial controller into two or more topics.

10. The industrial controller of claim 9, wherein the first broker processes a subscription request from the at least one entity to subscribe to a subset of the two or more topics, and delivers a message associated with the subset to the at least one entity based on the subscription request.

11. A method for decoupled delivery of messages in an industrial control environment, comprising:
receiving, at a broker residing on an industrial controller, a message from the industrial controller;
storing the message in a message data queue;
receiving, at the broker, a schema, from the industrial controller, specifying a format for the message;
storing the schema in a message revision queue; and
delivering, by the broker, the message and the schema, according to at least one notification policy, to at least one entity subscribed to receive the message.

12. The method of claim 11, wherein the receiving the message comprises receiving the message independent of an availability of the at least one entity to receive the message.

13. The method of claim 11, wherein the delivering comprises delivering the message in response to a determination that a data change reported by the message is greater than a threshold value.

14. The method of claim 11, further comprising deleting the message in response to a determination that the message remains unhandled after at least an elapsed time specified by the at least one entity.

15. The method of claim 11, further comprising transmitting a notification to the at least one entity in response to the receiving the message, the notification containing an indication that the message is available for retrieval.

16. The method of claim 11, wherein the storing the message comprises storing the message in one of at least two topic-specific queues based on a topic of the message.

17. The method of claim 16, further comprising:
receiving a request from the at least one entity to subscribe to a selected queue of the at least two topic-specific queues; and
delivering messages stored in the selected queue to the at least one entity in response to detecting that the at least one entity is available to receive messages.

18. A non-transitory computer-readable medium having stored thereon computer-executable components that, in response to execution, cause a broker residing on an automation controller to perform operations, including:
receiving a message generated by the automation controller; storing the message in a message data queue; receiving a schema indicating a format of the message;
publishing the schema in a message revision queue; and
delivering the message and the schema according to at least one notification policy to at least one entity subscribed to receive the message.

19. The non-transitory computer-readable medium of claim 18, wherein the receiving the message comprises receiving the message independent of an availability of the at least one entity to receive the message.

20. The industrial controller of claim 1, wherein the industrial controller controls one or more of an industrial process, manufacturing equipment, or a plant.

* * * * *